United States Patent [19]
Schierbeek et al.

[11] Patent Number: 5,131,154

[45] Date of Patent: Jul. 21, 1992

[54] METHOD AND APPARATUS FOR COMPENSATING A MAGNETIC COMPASS

[75] Inventors: Kenneth L. Schierbeek, Zeeland; Kenneth Schofield; Dan V. Bui, both of Holland, all of Mich.

[73] Assignee: Donnelly Corporation, Holland, Mich.

[21] Appl. No.: 597,854

[22] Filed: Oct. 15, 1990

[51] Int. Cl.⁵ ............................................. G01C 17/26
[52] U.S. Cl. .................................... 33/356; 33/363 K
[58] Field of Search ............. 33/356, 357, 358, 363 R, 33/363 K, 355 R

[56] References Cited

U.S. PATENT DOCUMENTS

| | | | |
|---|---|---|---|
| 4,720,992 | 1/1988 | Hormel | 33/356 X |
| 4,733,179 | 3/1988 | Bauer et al. | 33/356 X |
| 4,862,594 | 9/1989 | Schierbeek et al. | 33/356 |
| 4,866,627 | 9/1989 | Suyama | 33/356 X |
| 4,937,945 | 7/1990 | Schofield et al. | 33/356 |

Primary Examiner—Harry N. Haroian
Attorney, Agent, or Firm—Reising, Ethington, Barnard, Perry & Milton

[57] ABSTRACT

Method and apparatus are disclosed for compensating a magnetic compass in a vehicle for magnetic deviation. With the compass installed, the angle indicated by the magnetic compass relative to a direction axis of the vehicle is measured. A test magnetic field is added at a known angle relative to the direction axis of the vehicle. The strength of the test magnetic field required to displace the direction indicated by the compass through a predetermined angle is memorized. Then, the strength of the resultant magnetic field is calculated using the measured angle, the predetermined angle and the memorized strength of the magnetic field. After determining the strength of the resultant magnetic field with the vehicle oriented in any selected direction, the vehicle is then reoriented in a direction one hundred eighty degrees away from the selected direction and the strength of the resultant magnetic field in that orientation is determined in the same way. The value of the deviating magnetic field is calculated as one-half the vector sum of the two resultant magnetic fields.

14 Claims, 11 Drawing Sheets

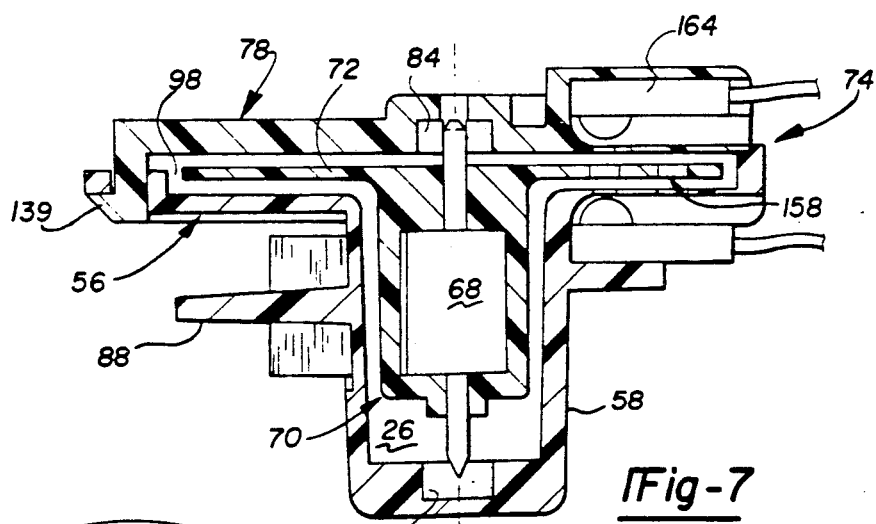
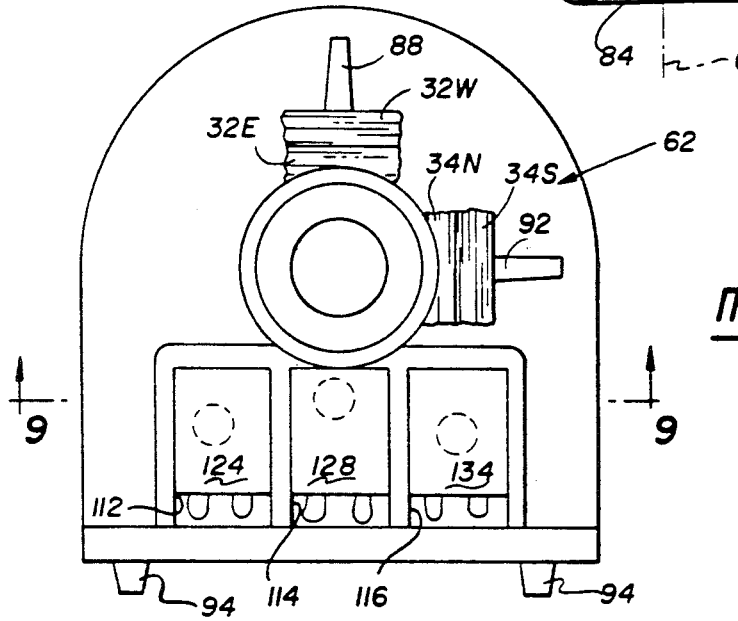
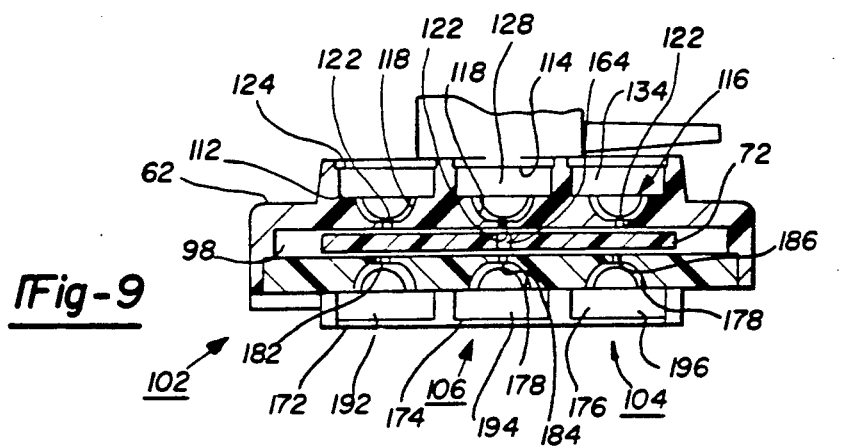

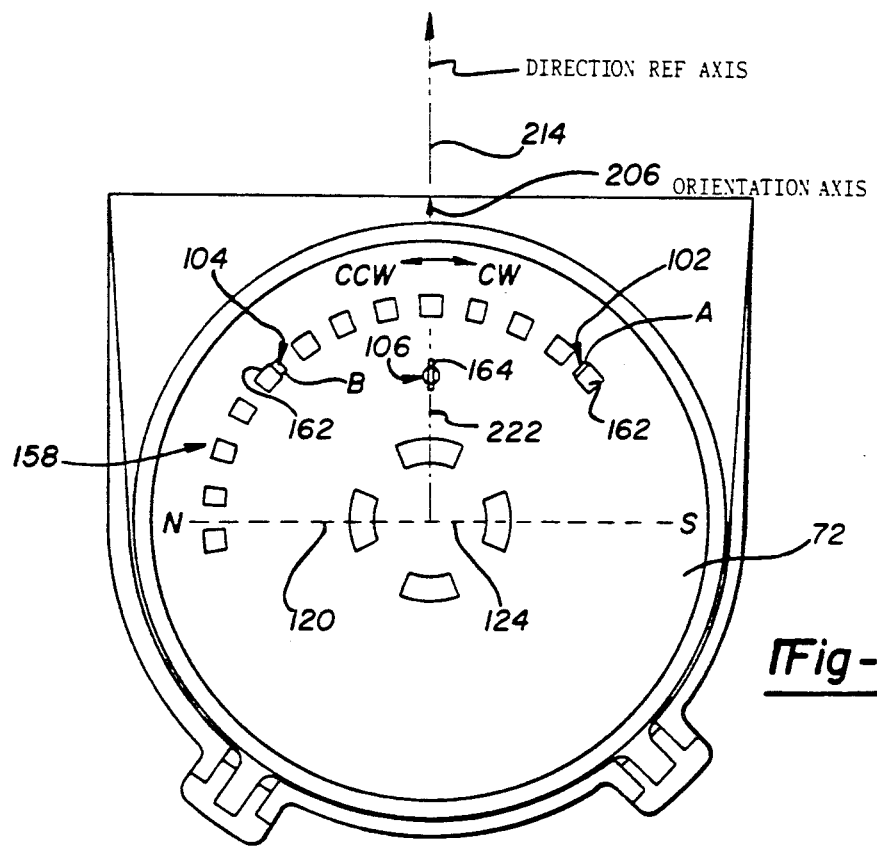
Fig-10
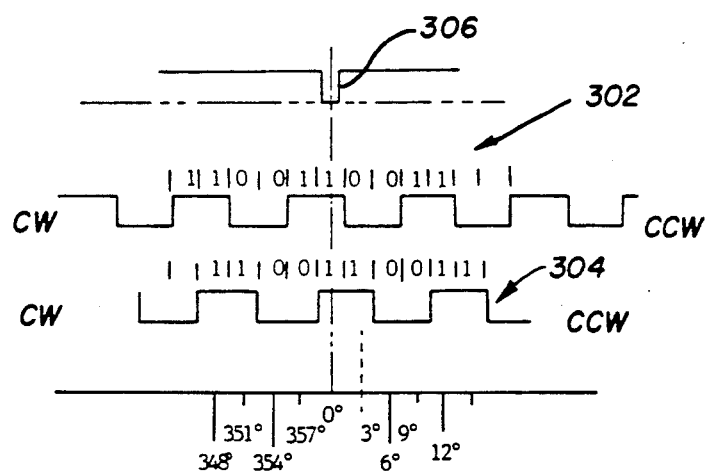
Fig-13
Fig-14
| COUNT | DEGREES | CCW | CW | DEGREES | COUNT |
|---|---|---|---|---|---|
| 120 | 268½ – 271½ | 11 | 11 | 268½ – 271½ | 0 |
| 119 | 265½ – 268½ | 01 | 10 | 271½ – 274½ | 1 |
| 118 | 262½ – 265½ | 00 | 00 | 274½ – 277½ | 2 |
| 117 | 559½ – 262½ | 10 | 01 | 277½ – 280½ | 3 |
|  |  | 11 | 11 |  |  |

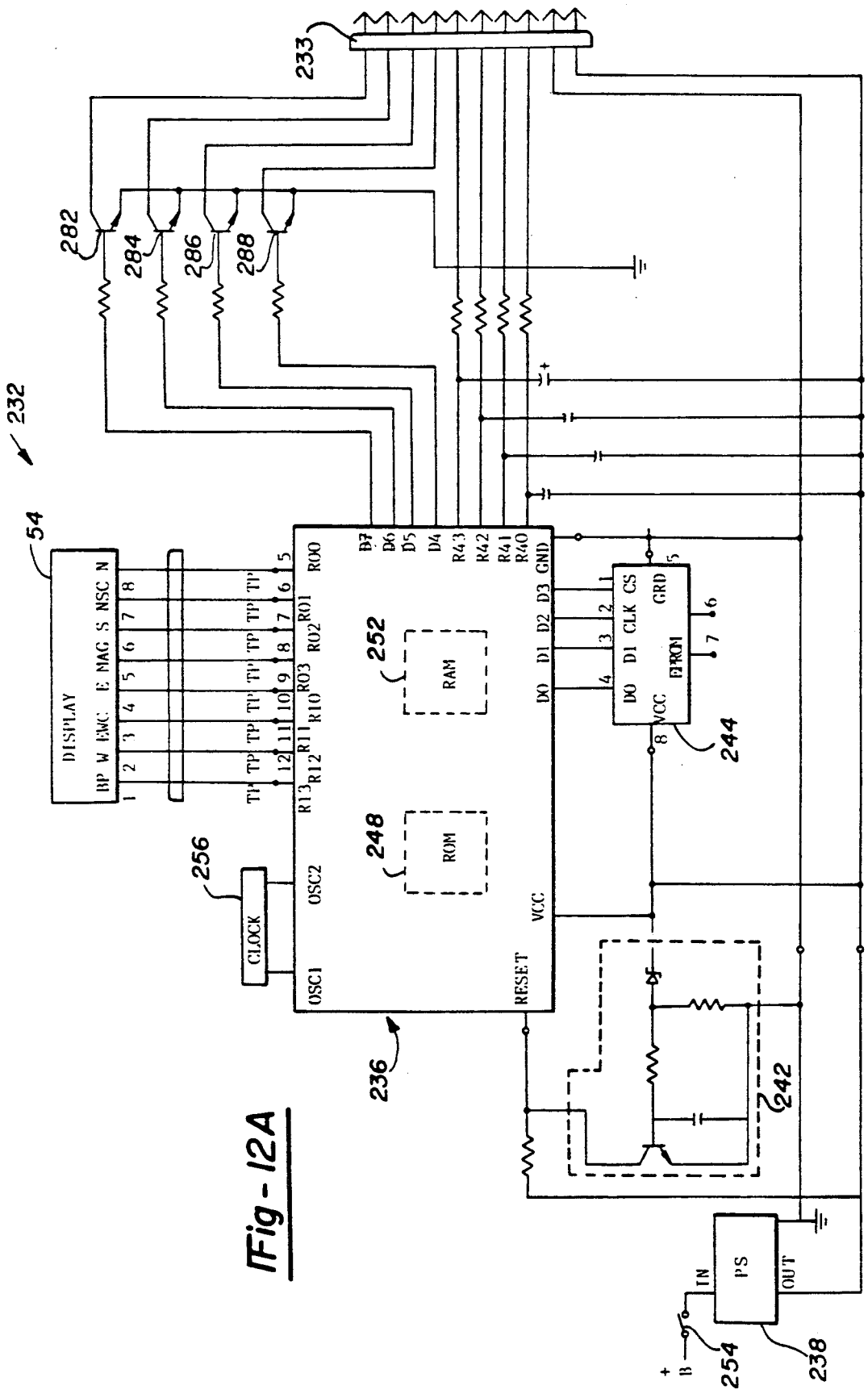

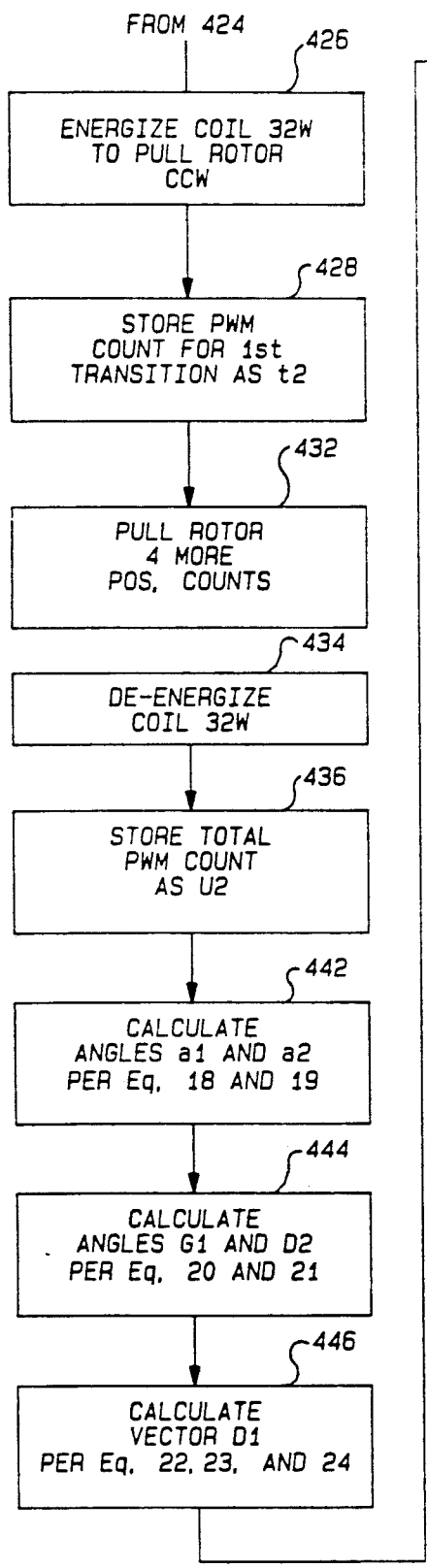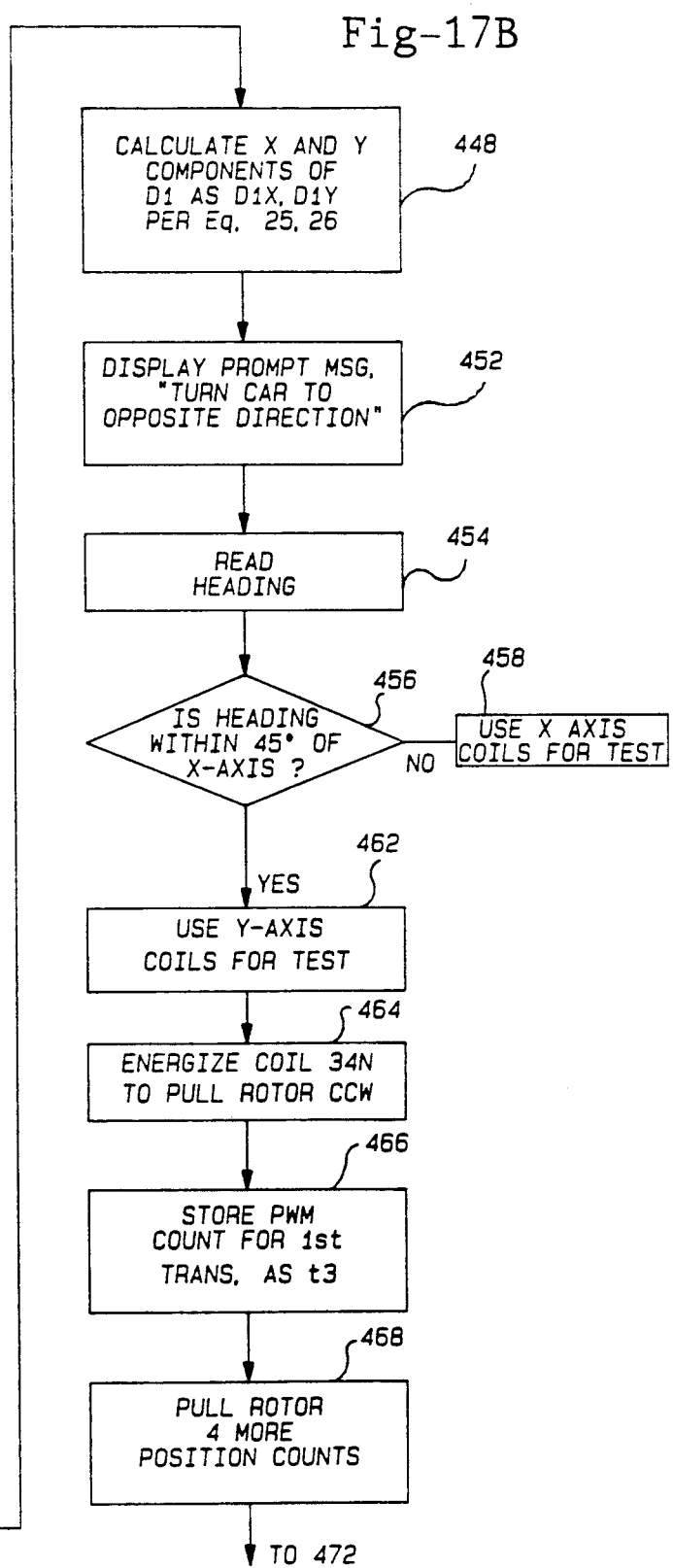
Fig-17B

METHOD AND APPARATUS FOR COMPENSATING A MAGNETIC COMPASS

FIELD OF THE INVENTION

This invention relates to magnetic compasses for vehicles; more particularly, it relates to a method of providing deviation compensation for magnetic compasses.

BACKGROUND OF THE INVENTION

A magnetic compass which is installed in a vehicle must be calibrated in the vehicle to account for the disturbing effect of the vehicle on the earth's magnetic field. It is well known that automotive land vehicles, as well as boats and aircraft, produce a magnetic field due to the presence of ferromagnetic materials, electrical current carrying wires and the like and this magnetic field interferes with the earth's magnetic field at locations within and adjacent the body of the vehicle. The magnetic field sensor of a magnetic compass responds to the ambient or local magnetic field within which it is immersed for the purpose of direction finding with reference to the earth's magnetic field. The magnetic field vector produced by the vehicle, herein referred to as the deviating magnetic field vector, combines with the earth's magnetic field vector to produce a resultant magnetic field vector which, without calibration or compensation, is unsuitable for reliable and accurate direction finding. The resultant magnetic field vector must be compensated for deviation in order to obtain accurate direction finding by a magnetic compass.

It is known in the prior art to provide deviation compensation in a magnetic compass by a pair of compensation coils which are energized with current to generate a magnetic field which is equal and opposite to the deviating magnetic field. Deviation compensation of this type for an automotive vehicle compass is disclosed in the Dinsmore U.S. Pat. No. 4,402,142 granted Sep. 6, 1983. This type of deviation compensation is also disclosed in the Schierbeek et al U.S. Pat. No. 4,862,594 granted Sep. 5, 1989. In this method of deviation compensation, the vehicle must be oriented with a heading aligned with one of the four cardinal directions relative to magnetic north with coil current adjustment being made to obtain a compass indication corresponding to the cardinal point and then the vehicle must be reoriented to a heading corresponding to another cardinal point at right angles to the first and the current in the corresponding compensation coil is adjusted to obtain compass indication of the second orientation. This procedure for deviation compensation is usually carried out by the vehicle driver and even though it may be automated in a computer controlled compass, it results in inaccuracy unless the vehicle heading is accurately aligned relative to magnetic north.

Another method of deviation compensation for magnetic compasses in vehicles is also known and is referred herein as the one hundred eighty degree compensation method. In this method, the magnetic field which is the resultant of the earth's field and the deviating field of the vehicle is measured with the vehicle in a selected orientation relative to magnetic north and then the resultant field is measured with the vehicle in an orientation one hundred eighty degrees from the first. Using the measured values of the magnitude and directions of the resultant fields, the deviating field is calculated in both magnitude and direction. The calculated value of the deviating field is stored and subtracted from the magnetic field measurements subsequently taken by the compass in use for direction finding to thereby compensate it for deviation. This method of deviation compensation for a flux gate compass is disclosed in the Bauer et al U.S. Pat. 4,733,179 granted Mar. 22, 1988 and in the Hormel U.S. Pat. No. 4,720,992 granted Jan. 26, 1988. The one hundred eighty degree method for deviation compensation has been known for a long time for use with flux gate compasses for aircraft as shown by the Baker et al U.S. Pat. No. 3,683,668 granted Aug. 15, 1972.

Heretofore, magnetic rotor compasses, i.e. those having a magnetic rotor have required orientation at a known angle relative to magnetic north to obtain deviation compensation. It is desirable in vehicle compasses to provide a magnetic rotor compass with the advantages of the one hundred eighty degree method of compensation.

A general object of this invention is to provide an improved method of and apparatus for compensating a magnetic rotor compass for deviation and to overcome certain disadvantages in the prior art.

SUMMARY OF THE INVENTION

In accordance with this invention, method and apparatus are provided for determining the strength of the magnetic field in a vehicle which results from the combination of a deviating magnetic field originating in the vehicle and the earth's magnetic field. This is accomplished by measuring the angle between a direction reference axis of the vehicle and the direction indicated by the magnetic compass in the vehicle and adding a test field at a known angle relative to the direction reference axis of the vehicle. The strength of the test magnetic field which is required to displace the direction indicated by the compass through a predetermined angle is memorized. Then the strength of the resultant magnetic field is calculated using the measured angle, the predetermined angle and the memorized strength of the test magnetic field. The resultant magnetic field is useful for compensating a magnetic compass for the deviating magnetic field.

Further, in accordance with this invention, method and apparatus are provided for compensating a magnetic compass in a vehicle for magnetic deviation. This is accomplished by orienting a vehicle in any selected direction relative to magnetic north and determining the strength of the resultant magnetic field in the vehicle using the method described above. Then, the vehicle is oriented in a direction one hundred eighty degrees from the selected direction and the strength of the resultant magnetic field is determined in the same way as described above. The value of the deviating magnetic field is then calculated as one-half of the two resultant magnetic fields.

Further in accordance with this invention, method and apparatus are provided for compensating a magnetic rotor compass for deviation. The previously known one hundred eighty degree compensation method is utilized in order to avoid the requirement for aligning the vehicle in a predetermined direction relative to magnetic north as has been required in magnetic rotor compasses. According to the invention, the vehicle is oriented in an arbitrary direction relative to magnetic north and in a second orientation, the opposite direction. In each orientation, a value of the resultant field vector (which is the resultant of earth's field and the vehicle field) is determined by using a test current in one of the compensation coils to swing the rotor through a known angle to obtain sufficient information to calculate the resultant field vector. The resultant field vectors for the two orientations together with the memorized values of the currents for swinging the rotor provide sufficient information to calculate the required compensating currents to compensate the compass for deviation due to the vehicle field.

Further, in accordance with the invention, a method is provided for obtaining a high degree of accuracy in determining the compensating current required even though the compass is provided with an angular measurement encoder with relatively low resolution.

Further, in accordance with this invention, the compensation method is useful for magnetic rotor compasses having incremental angular measurement encoders as well as absolute angular measurement encoders.

DESCRIPTION OF THE DRAWINGS

FIGS. 6, 7, 8, 9 and lo show a particular embodiment of a vehicle compass for compensation according to this invention;

FIGS. 12A and 12B show a schematic diagram of the electronic circuit of the compass;

FIG. 13 is a waveform diagram of the operation of the compass encoder;

FIG. 14 is a table of values showing operation of the encoder;

FIGS. 17A, 17B and 17C are flow charts representing the program of the microcomputer of the compass.

BEST MODE FOR CARRYING OUT THE INVENTION

An illustrative embodiment of the invention will be described with reference to the drawings which depict a magnetic rotor compass which is to be compensated for deviation in accordance with this invention. The deviation compensation method of this invention will first be described with reference to the general case of a magnetic rotor compass. Following that, the invention will be described with reference to a specific embodiment of a magnetic rotor compass. It will be appreciated as the description proceeds that the invention may be embodied in different forms and may be used in other applications.

GENERAL DESCRIPTION OF THE DEVIATION COMPENSATION METHOD

Figure 1:
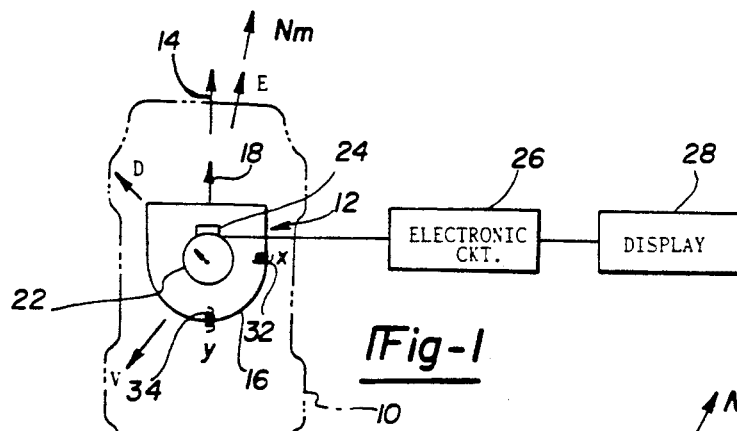
FIG. 1 is a block diagram showing a magnetic rotor compass installed in a vehicle to be compensated for deviation according to this invention.

This invention will now be described with reference to the general case of deviation compensation for a magnetic rotor compass in a vehicle. FIG. 1 illustrates in phantom line an automotive vehicle 10 with a magnetic compass 12 installed therein. The vehicle 10 has a direction reference axis 14 which coincides with its fore and aft or longitudinal axis. The direction reference axis 14 represents the heading of the vehicle 10 and the purpose of the compass 12 is to determine the heading with reference to the magnetic north direction indicated by the arrow $N_m$. The magnetic heading may be converted to the true heading, i.e. with reference to true north, by algebraically adding the value of magnetic variation for the locality of the vehicle. As used herein, the term "heading" means the direction of the longitudinal axis of the vehicle relative to the reference direction, such as magnetic north or true north. The term "true north" as well as the term "geographic north" mean the direction of the pole star polaris. The term "magnetic north" means the direction of the local magnetic field of the earth.

The magnetic compass 12 comprises a compass frame 16 with a frame orientation axis 18. A rotor 22 is mounted on the frame for rotation about a vertical axis. The compass is installed with its orientation axis 18 aligned with the vehicle direction reference axis 14. The rotor carries a magnet with its polar axis in the horizontal plane and which seeks to orient its polar axis with the local magnetic field. The compass is provided with an angular position encoder 24 which provides a direction data signal representing the angular displacement of the rotor from some reference position or direction. The direction data signal from the encoder is coupled to an electronic circuit 26 which in turn is coupled to a compass display 28. The direction data signal from the encoder 24 is processed by the electronic circuit 26 to produce a heading signal which represents the heading of the vehicle relative to the local magnetic field. The heading signal represents the angle between the direction of the local magnetic field vector and the direction reference axis of the vehicle and is suitably displayed on the display 28 in terms of angular degrees.

The compass 12 is provided with a pair of compensation coils 32 and 34 for producing a compensating magnetic field which affects the local magnetic field and influences the orientation of the rotor 22, as will be described hereinafter. The compensation coil 34 has a coil axis which defines a Y-axis of the compass and which is aligned with the orientation axis 18 of the compass. The coil 32 is disposed with its coil axis in orthogonal relationship with the Y-axis and defines the X-axis of the compass.

As illustrated in FIG. 1, the earth's magnetic field is represented by a vector E. The vehicle produces a deviating magnetic field represented by the vector V. The deviating field vector has a constant magnitude and direction relative to the direction reference axis 14 and may be regarded as a characteristic of the particular vehicle. On the other hand, for a given locale, the direction of the earth's magnetic field vector E is constant relative to the true north direction. For a given orientation of the vehicle relative to the earth's magnetic field, the earth's field E and the deviating field V produce a resultant field represented by the vector D. It is desired, of course, to have the rotor 22 of the compass align itself with the earth's magnetic field E and thereby obtain a heading signal from the compass 12 relative to magnetic north. However, the presence of a deviating field V produces the resultant field of vector D which is displaced from the direction of the earth's field. This deviation of the resultant field is variable as a function of the orientation of the vehicle. Accordingly, it is necessary to remove the influence of the deviating magnetic field V so that the rotor of the compass responds only to the earth's magnetic field E.

In order to remove the influence Of the deviating magnetic field V, it is necessary to determine the magnitude and direction of it by measurement and calculation. A useful expression for the value of the deviating field V can be derived by what is herein referred to as the one hundred eighty degree compensation method. In this method, a vehicle is oriented in any arbitrary direction prior to any compensation and the summation of the earth's field E and the deviating field V produces a first resultant field D1. Then, the vehicle is turned through one hundred eighty degrees so that it points in the opposite direction thereby producing a resultant vector D2. The desired expression for the deviating field V in terms of the resultant fields D1 and D2 may be derived as follows.

Figure 2A:
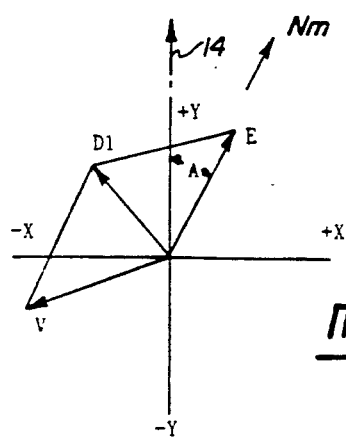
FIGS. 2A, 2B, 3A, 3B and 4 are vector diagrams useful for explaining the principles of this invention.
Figure 2B:
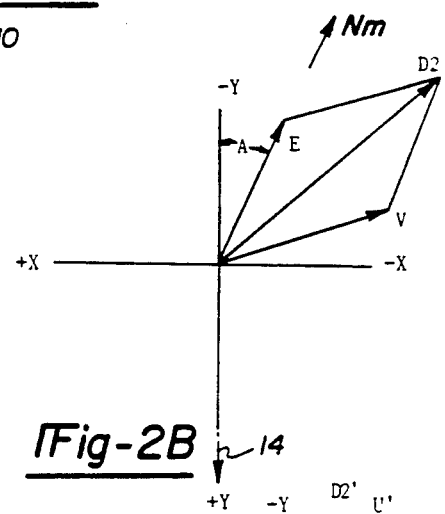

Referring now to FIG. 2A, the direction reference axis 14 of the vehicle is oriented at an arbitrary angle A with reference to the earth's magnetic field vector E, i.e. magnetic north. The deviating field produced by the vehicle represented by vector V is vectorially added to the vector E to produce the resultant magnetic field represented by the vector D1. Next, as shown in FIG. 2B, it is assumed that the vehicle is turned through one hundred eighty degrees so that the direction reference axis 14 (and the deviating field vector V) are reversed in direction relative to the earth's magnetic field vector E. In this orientation, the direction reference axis 14 is at an angle of one hundred eighty degrees minus A from the earth's magnetic field vector E. In this orientation, the deviation field vector V is vectorially added to the earth's magnetic field vector E to produce the resultant field vector D2. From FIG. 2A, it is apparent that:

$$D1 = E + V \quad (1)$$

From FIG. 2B it is noted that:

$$D2 = E + V \quad (2)$$

It is further noted with reference to equation (2) that the vector E is negative because the X-Y coordinate system is rotated one hundred eighty degrees along with the vector V relative to that shown in FIG. 2A while the vector E remains fixed with reference to the magnetic north vector $N_m$. Adding equations (1) and (2) and dividing both sides by 2 yields:

$$V = (D1 + D2)/2 \quad (3)$$

Equation (3) expresses the value of the deviating field vector V in terms of the resultant field vectors D1 and D2 without need for determining the value of the earth's field vector E.

Figure 3A:
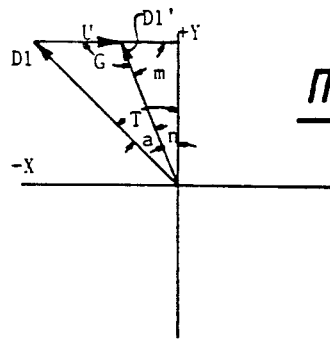
Figure 3B:
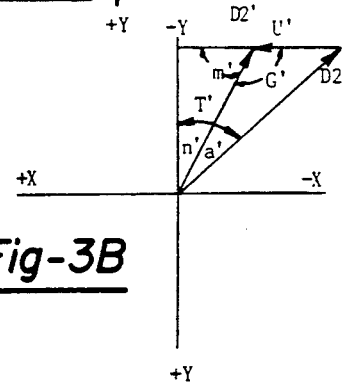

As set forth above, the value of the deviating field vector V may be obtained as a function of the resultant field vectors D1 and D2 as shown in equation (3). The values of the vectors D1 and D2 are obtained using the compass 12 after it is installed in the vehicle 10 as illustrated in FIG. 1. The method of obtaining the values of D1 and D2 will be described with reference to FIGS. 3A and 3B. FIG. 3A is a vector diagram showing the resultant field vector D1 with the vehicle oriented in any selected direction relative to magnetic north. FIG. 3B is a vector diagram including the resultant field vector D2 which results from the vehicle being oriented in the opposite direction, as described above with reference FIG. 2B. In the first orientation of the vehicle, the compass rotor 22 will be aligned with its polar axis in alignment with the resultant field vector D1 and the compass reading on the display 28 will be T degrees which is the angular displacement of the rotor from the Y-axis of the compass as shown in FIG. 3A. The X-axis compensation coil 32 is energized with a sufficient current to pull the rotor toward the Y-axis through an angle a of a predetermined value, say twelve degrees which results in a displaced field vector D1'. The required value of current is memorized and is represented by the vector U in FIG. 3A. The value of the angle G between the resultant field vector D1 and the vector U can be derived as follows. By inspection of the vector diagram of FIG. 3A it can be seen that:

$$G = 180° - m \quad (4)$$

Since angles n and m are complementary, this can be written as:

$$G = 90° + n \quad (5)$$

and it can be seen that:

$$n = T - a \quad (6)$$

Therefore the angle G can be expressed as:

$$G = 90° + T - a \quad (7)$$

Using the law of sines, the value of D1 can be expressed as:

$$D1 = (U \sin G)/\sin a \quad (8)$$

The X-axis component of the resultant field vector D1 can be written as:

$$D1X = D1 \cos (90° - T) \quad (9)$$

and the Y-axis component can be written as:

$$D1Y = D1 \sin (90° - T) \quad (10)$$

In a similar manner, the value of the resultant field vector D2 can be derived, with reference to FIG. 3B, as:

$$D2 = (U \sin G')/\sin a' \quad (11)$$

The X and Y-axis components of the resultant vector D2 can be written as:

$$D2X = D2 \cos (90° - T') \quad (12)$$

and $$D2Y = D2 \sin (90° - T') \quad (13)$$

For the purpose of compensating the compass for deviation, the value of the deviating field vector V is required. Its value, expressed in terms of the resultant field vectors, is known from equation (3). Accordingly, with reference to equation (3) and equations (9) and (12), the X-axis component VX of the deviating field vector V can be written as:

$$VX = \cos (90° - T) (D1 + D2)/2 \quad (14)$$

Likewise, the Y-axis component VY of the deviating field vector V can be expressed as follows:

$$VY = \sin(90° - T)(D1 + D2)/2 \qquad (15)$$

Figure 4:
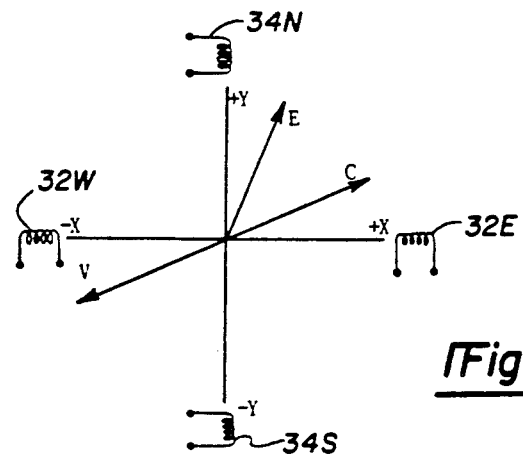

In order to compensate for the effect of the vehicle's magnetic field vector V, a compensating field vector C, equal and opposite to vector V, must be generated. This is done by using the compensation coils 32 and 34 which, as described with reference to FIG. 1, are disposed with their coil axes aligned respectively with the X and Y-axes of the compass. Since the Y-axis is aligned with the longitudinal axis or direction reference axis 14 of the vehicle, and the vehicle heading is measured with reference to magnetic north, the Y-axis is herein termed the north-south axis and the X-axis is herein termed the east-west axis. As shown in FIG. 4, the north-south coil 34 comprises coils 34N and 34S and the east-west coil 32 comprises coils 32E and 32W. The required compensating field vector C is shown in FIG. 4 as being equal and opposite to the deviating field vector V. The X-axis and Y-axis components of the compensating field vector C are, of course, equal and opposite to the respective components of the deviating field vector V. To obtain this, a compensating field current IVX must be supplied to one of the east-west coils which will generate a magnetic field vector equal to $-VX$ of equation (14). Similarly, compensating field current IVY must be supplied to one of the north-south coils which will produce a magnetic field equal to $-VY$ of equation (15). It is noted that if the value of VX is negative and VY is negative, the vector V lies in the third quadrant and it must be compensated with a compensating field vector C in the first quadrant, as illustrated in FIG. 4. The compensation coil 32E is energized to produce an X-axis component having a magnitude equal to VX of equation (14). Similarly, the compensation coil 34N will be energized to produce a Y-axis component equal to VY of equation (15). The value of energizing current required to produce the compensation field VX is determined empirically from the memorized value of current required to produce the field vector U as discussed with reference to FIG. 3A. The field vector U has a magnitude which is directly proportional to the memorized current value IU and accordingly, the value of current IVX required to produce the X-axis component VX of the field vector V can be expressed as:

$$IVX = VX(IU)/U \qquad (16)$$

Similarly, the current IVY required to produce the Y-axis component VY of the field vector V can be expressed as:

$$IVY = VY(IU)/U \qquad (17)$$

For the sake of accuracy, each of the compensating coils 32E, 32W, 34N and 34S should be wound to produce the same magnetic field strength along the respective axis for the same value of energizing current. Alternatively, the coils can be calibrated or normalized. In order to account for inequality among the compensating coils, the current requirements are normalized to produce equal field strengths by using a current calibrating factor for each of the coils in accordance with known techniques.

As discussed above, the compensating current IVX in the east compensating coil 32E produces the X-axis component of the compensating field vector C and the current IVY in coil 34N produces the Y-axis component of the compensating field vector C. The vector sum of the deviating field vector V and the compensating field vector C is zero. Thus, there is no net effect of vectors V and C on the rotor of the compass. Consequently, the compass rotor is influenced in its orientation only by the earth's magnetic field vector E and the compass is thus compensated for deviation.

A particular embodiment of the compass 12 will now be described.

GENERAL DESCRIPTION OF A PARTICULAR EMBODIMENT OF THE COMPASS SYSTEM

Before describing the compass and the compass electronics in detail, it will be helpful to consider the manner in which the compass operates to find the heading of the vehicle.

In general, the compass has a rotor which carries a magnet which seeks to orient its polar axis with the local magnetic field which, for the present purpose, may be considered to have the same orientation as the earth's magnetic field and hence has the direction of magnetic north. The compass is provided with an angular position encoder which provides a direction data signal representing the angular displacement from some reference position or direction. The compass rotor is initially oriented in the reference direction and then the angular displacement of the rotor, either clockwise or counterclockwise, is measured by the encoder until it settles in alignment with the local magnetic field. The net displacement is taken as the heading angle indicated by the compass relative to the reference direction. This method of finding the vehicle heading by measurement of the relative displacement, rather than obtaining a measurement in an absolute sense, greatly simplifies the structure and the electronics of the vehicle compass.

Figure 5:
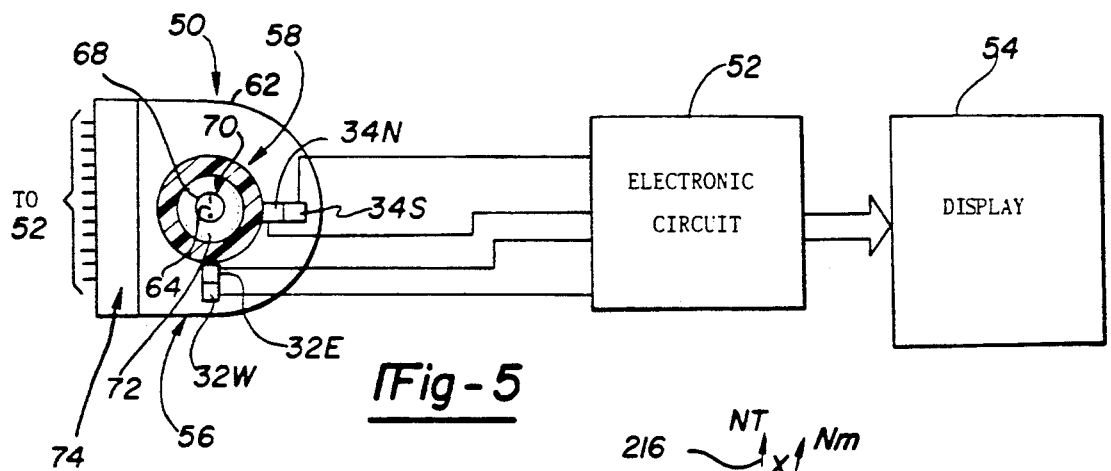
FIG. 5 shows a block diagram of the compass system.

FIG. 5 shows a compass system with the compass 50 shown in a bottom plan view partially in section. In general, the system comprises the compass 50, an electronic circuit 52 and a remote compass display 54. The compass 50, in general, comprises a support body 56 including a cylindrical cup 58 and a base 62. The cylindrical cup 58 has a longitudinally extending axis 64 and defines a chamber around the axis. A compass magnet 68 of cylindrical shape is radially polarized and is mounted on a rotor 70 for rotation about the longitudinal axis 64. The compass magnet 68 is freely rotatable relative to the body 56 and, in the manner of a compass needle, it aligns itself with the local magnetic field. The angular position of the compass magnet is detected by an optical position encoder which comprises an encoder disk 72 which is mounted for rotation with the compass magnet 68. The encoder also comprises an optical transducer 74 coacting with the encoder disk 72. In order to compensate for deviation, a set of compensation coils 32E, 32W, 34N, 34S are provided. The optical transducer 74 coacting with the encoder disk 72 develops a direction data signal which is electrically coupled with the electronic circuit 52 which decodes the signals and develops a heading signal corresponding to the heading of the vehicle. The heading signal is applied by the electronic circuit 52 to the compass display 54 for visual presentation of the vehicle heading. The read-out of the display 54 may be expressed in degrees or it may be expressed in abbreviated notation for the compass points such as N, E, S and W for the cardinal points and NE, SE, SW and NW for the intercardinal or secondary compass points. The compass 50 will now be described in greater detail.

DETAILED DESCRIPTION OF THE COMPASS

The compass 50 is shown in detail in FIGS. 6, 7, 8 and 9. The compass is adapted for mounting in the orientation shown in FIG. 7, i.e. the axis 64 is aligned in the vertical direction and the cup 58 is the bottom member of the compass. The compass 50 comprises, in general, a frame including a support body 56 and a cover plate 78 with the rotor 70 therein. The support body 56 includes the cylindrical cup 58 and the base 62. The cylindrical cup defines a cavity around the longitudinal axis 64. The rotor 70 carries the compass magnet 68 and is rotatably mounted by pivot pins which are supported, respectively, in bearing elements 84 in the cup 58 in the cover plate. The optical position encoder comprises the encoder disk 72 which is integral with the rotor and it comprises the optical transducer 74. The compensation coils 32E and 32W are mounted on coil support arm 88 and coils 34N and 34S are mounted on coil support arm 92 on the outside periphery of the cup and are angularly spaced by ninety degrees and are in close proximity with the compass magnet.

The support body 56, including the base 62 and the cup 58, is a unitary molded body of polymeric material such as nylon. The base has a semi-cylindrical portion and a flat upper surface on one side of the cup. The base is formed with a rectangular portion on the other side of the cup. This portion is provided with a pair of mounting studs 94 which are adapted to mate with mounting holes in the electrical connector 96 for support of the compass. The upper surface of the base, as shown in FIG. 7, is provided with a cylindrical recess 98 for accommodating the encoder disk. The rectangular portion of the base 62, as shown in FIG. 8, supports the phototransistors of the optical transducer 74.

The optical transducer 74 comprises a pair of displacement sensors 102 and 104 and a reference position sensor 106. (See FIG. 9). The transducer includes plural sets of light emitting diodes (LEDs) and phototransistors in an arrangement which will be described subsequently. For the purpose of retaining three phototransistors, the base 62 is formed with three side-by-side compartments 112, 114 and 116. Each of these compartments has an interior wall configuration which conforms with the package configuration of a phototransistor; the wall configuration includes a channel 118 adapted to receive the lens of the phototransistor. As shown in FIGS. 8 and 9, the compartments 112, 114 and 116 receive phototransistors 124, 128 and 134, respectively. The channel of compartment 112 is provided with an aperture or slot 122 for phototransistor 124. Similarly, the channel of compartment 114 is provided with a slot 122 for phototransistor 128 and the channel of compartment 116 is provided with a slot 132 for phototransistor 134.

The encoder disk 72 is provided with a single code track 158 of optical apertures 162 for providing angular displacement information. The apertures are equally spaced and, in the illustrative example, there are thirty apertures in the track. In addition to the angular position encoder track 158, a reference position aperture 164 is provided at a predetermined angular location relative to the polar axis of the compass magnet 68; in the illustrative embodiment it is centered on a line perpendicular to the polar axis.

The cover plate 78 comprises a unitary molded cylindrical member which is adapted to fit in a snug relationship with the cylindrical recess on the support body 56.

The cover plate 78 is formed with a set of three compartments 172, 174 and 176 each of which is adapted to retain an infrared light emitting diode (LED). Each compartment has a wall configuration which conforms to the package configuration of the LED. Each compartment is provided with a channel 178 which accommodates the lens of the LED. The cover plate is formed with an aperture or slot 182 above the compartment 172 and in alignment with the slot 122 in compartment 112. Similarly, the plate is formed With slots 182 which are located above the compartments 174 and 176, respectively, and are aligned with the slots in compartments 114 and 116, respectively. LEDs 192, 194 and 196 are located in the compartment 112, 114 and 116, respectively. As will be described subsequently, the LEDs 192, 194 and 196 and the phototransistors 124, 128 and 134 are electrically connected with the electronic circuit 52.

Figure 6:
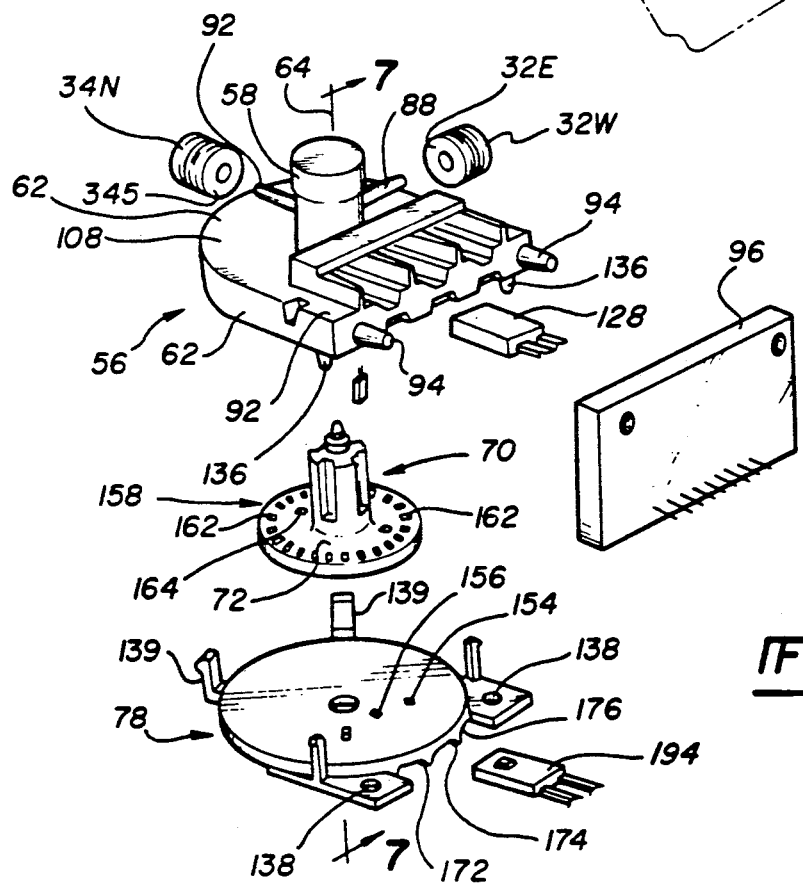

A pair of alignment pins 136 are formed on the base 62 and mate with alignment holes 138 on the cover 78 (see FIG. 6). The cover 78 has a set of four pawls 139 which interlock with the base to hold the cover to the base.

The LED 194 and the phototransistor 128 comprise the reference position sensor 106 which produces a reference signal pulse when the encoder disk 72 is in an angular position such that the reference aperture 164 is in alignment with the apertures 122 and 184 of compartments 114 and 174. The LED 192 and the phototransistor 124 comprise a first angular displacement sensor 102 and the LED 196 and phototransistor 134 comprise a second angular displacement sensor 104.

The compass frame comprising the body 56 and cover plate 78 has an orientation axis 206 which coincides with a line extending through the axis of rotor 70 and the slot 122 of the reference position sensor 106. This orientation axis 206 (see arrow FIG. 10) is perpendicular to the end of the rectangular portion of support body 56.

METHOD OF DETERMINING VEHICLE HEADING

Figure 11:
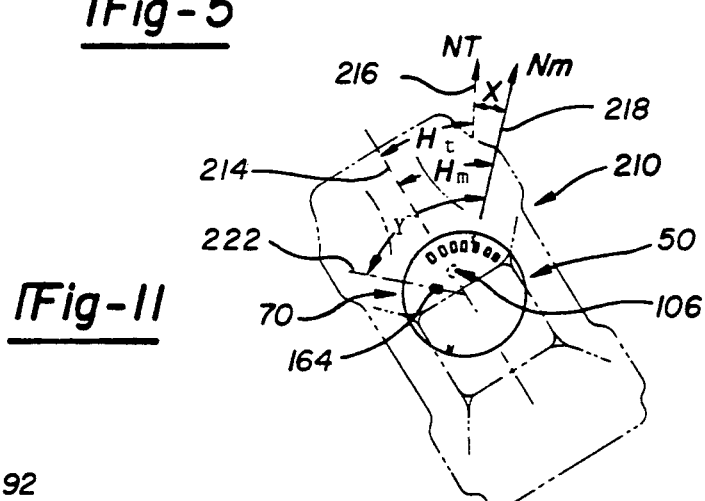
FIG. 11 is a diagrammatic representation of the vehicle compass installed in a Vehicle.

Before describing the electronic circuit 52 of the compass system, the method for finding the heading of a vehicle will be described with reference to FIG. 11. FIG. 11 illustrates in phantom line, an automotive vehicle 210 having a direction reference axis (coinciding with its longitudinal axis) indicated by the dashed line arrow 214. The direction reference axis 214 represents the heading of the vehicle and it is desired to determine such heading with reference to the true north direction indicated by the dashed line arrow 216. The vehicle is equipped with the magnetic compass 50 which includes a compass magnet on a rotor so that it seeks to orient the polar axis of the magnet with the direction of the local magnetic field. The compass 50 has its orientation axis 206 in alignment with the direction reference axis 214 of the vehicle. It will be assumed for purposes of the discussion of the method of determining vehicle heading, that the magnetic compass installation in the vehicle is already provided with deviation compensation, by compensation coils, to provide a compensating magnetic field which offsets the influence of the magnetic environment. With deviation compensation, the local magnetic field coincides in direction with magnetic north. The direction of magnetic north in FIG. 11 is indicated by the solid line arrow 218. As shown in FIG. 11, the polar axis of the rotor 70, as represented by a line between the N-S symbols, is in alignment with the direction of magnetic north arrow 218. Thus, the heading of the vehicle relative to magnetic north is represented by the angle $H_m$. As is well known, the direction of the local magnetic field of the earth departs from the direction of true north by a variation angle which is different for different geographic locations. As shown in FIGURE 11, the variation angle between the directions of magnetic north and true north is represented by the angle X. Consequently, the heading of the vehicle relative to true north is represented by the angle $H_t$ between the direction reference axis 214 and the true north direction which is indicated by the arrow 216. In order to determine the true heading $H_t$, it is necessary to first determine the magnetic heading and then algebraically add the variation angle X.

The magnetic heading $H_m$ is determined by measuring the angular displacement $H_m$ between the direction reference axis 214 and the polar axis of the rotor 70. For this purpose, a reference line 222 is defined by a line between the axis of rotation of the rotor and the reference position aperture 164 on the rotor. This reference line 222 is offset from the polar axis of the rotor by an offset angle Y which is ninety degrees in the example of the illustrative embodiment. The offset angle Y may be zero or any other value, depending upon the location of the reference position sensor 106 relative to the direction reference axis of the vehicle. In the example, the reference position sensor is on the direction reference axis. The rotor is provided with a relative measurement scale, i.e. a scale which includes a plurality of discrete markers which are angularly displaced a predetermined distance from each other but which does not indicate the total angular displacement between any one of the markers and any given reference line or marker. In the illustrative embodiment, the relative angular measurement scale on the rotor comprises the plurality of apertures 162 which were described above.

Using the relative measurement scale of the rotor 30 and the reference position sensor 164, the magnetic heading $H_m$ is determined as follows. The rotor is turned between the angular position in which the reference line 222 is in alignment with the direction reference axis 214 and the angular position in which the polar axis of the rotor is aligned with magnetic north and the turning motion between these angular positions is measured to obtain the magnetic heading.

Preferably, the method is carried out by allowing the rotor 70 to assume an arbitrary angular position relative to the direction reference axis. Typically, this angular position would be that in which the reference axis is aligned with magnetic north; however, the method allows for the possibility that the rotor may be in any angular position. Then, the rotor is turned from such arbitrary angular position relative to the direction reference axis through a sufficient angle for the reference aperture 164 to reach the reference position sensor 106 which, in the example, is aligned with the direction reference axis 214. This turning motion may be in either direction, clockwise or counterclockwise. (When the reference line 222 reaches or passes through alignment with the direction reference axis 214, the compass is said to be "initialized" since that alignment serves as the reference position for starting measurement of displacement relative thereto.) Then, the rotor is allowed to turn, under the influence of the local magnetic field, between the position in which the reference line is in alignment with the direction reference axis to the position in which the polar axis of the rotor is aligned with the local magnetic field. This turning motion may include some overshoot of the magnetic north direction but the rotor will settle into the magnetic north position after both clockwise and counterclockwise motion. The turning motion of the rotor from the direction reference axis position is measured on a continuous basis so that when it finally settles in alignment with the magnetic north direction, the net angular displacement, i.e. the combined clockwise and counterclockwise motion, represents the heading angle of the vehicle relative to magnetic north. When the turning motion is counterclockwise, the measured angular value plus the offset angle is added to zero degrees (value for magnetic north) to obtain the magnetic heading $H_m$. When the turning motion is counterclockwise, the measured angular value plus the offset angle is subtracted from three hundred sixty degrees (value for magnetic north) to obtain the magnetic heading $H_m$. The offset angle Y is a negative value when the reference aperture 164 leads the north seeking pole of the polar axis of the compass rotor. The offset angle has a positive value when the reference aperture lags the north seeking pole.

This measurement of angular displacement may be obtained by various means. The preferred means will be described in detail subsequently. If the measurement indicates a net clockwise angular displacement, it is added to the magnetic north direction of zero degrees. If the measurement indicates a net counterclockwise rotation, it is subtracted from the north direction of three hundred sixty degrees to obtain the magnetic heading. After the compass is initialized as described above, the vehicle heading is measured continuously relative to the reference position. After obtaining the magnetic heading, the true heading may be obtained by adding algerraically the variation angle X to the magnetic heading $H_m$. The value of the variation angle X is obtained by orienting the vehicle so that the direction reference axis is aligned with the true north direction and reading the measurement of the magnetic heading.

THE ELECTRONIC CIRCUIT

Figure 12B:
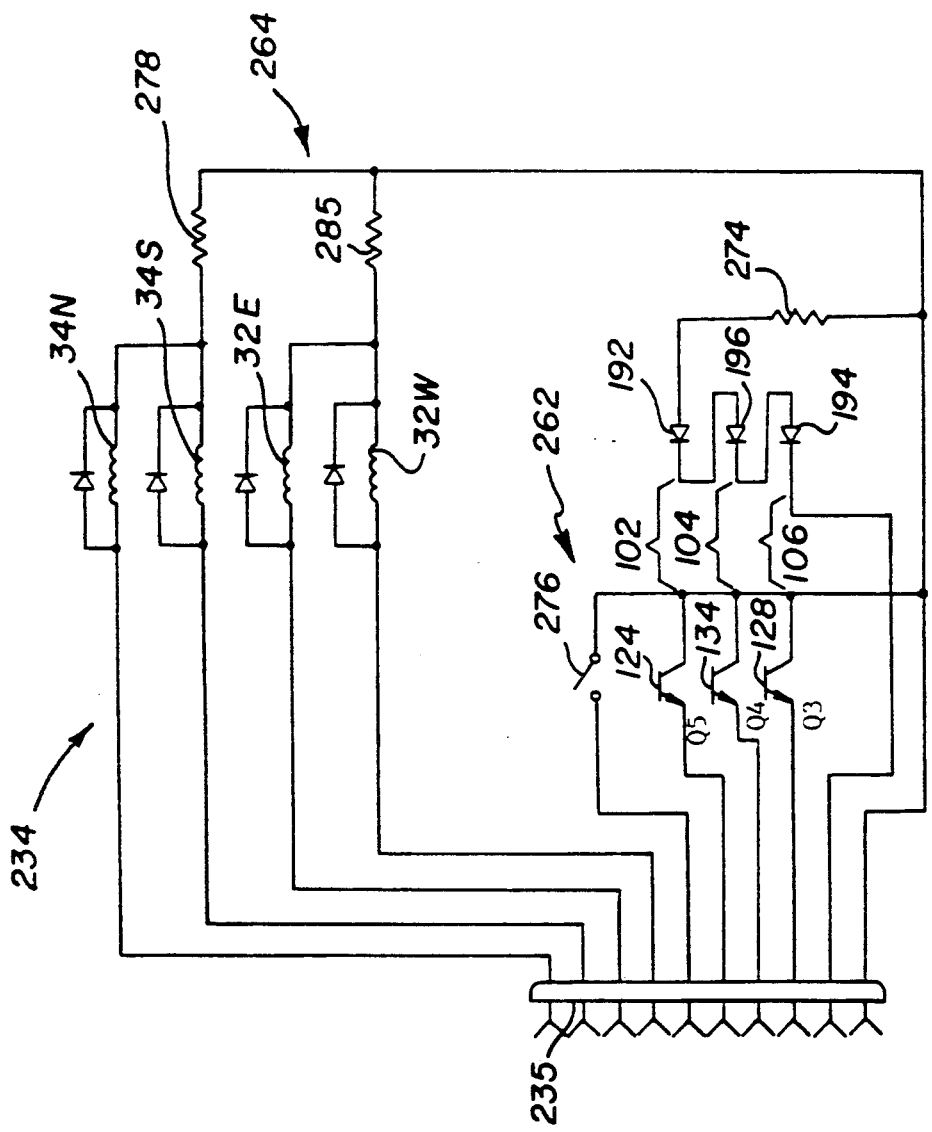

The electronic circuit for the compass system will be described with reference to FIGS. 12A and 12B. The electronic circuit 52 comprises a signal processing circuit 232 shown in FIG. 12A and a compass sensor circuit 234 shown in FIG. 12B. The sensor circuit 234 is located in the compass housing and is electrically connected, through a connector having complementary parts 233 and 235, with the signal processing circuit 232 which is suitably disposed with a display at a remote location in the vehicle. The signal processing circuit 232 includes a microcomputer 236. In addition, it comprises, in general, a power supply circuit 238, a reset circuit 242 for the microcomputer, and an electrically erasable programmable read-only memory (EEPROM) 244 for storing data to be utilized in the signal processing. The vehicle heading display 54 is controlled by the microcomputer and suitably takes the form of a liquid crystal multi-segment alphanumeric character display. The heading direction data signals are supplied from the sensor circuit 234 to the microcomputer 236. The microcomputer includes a read-only memory (ROM) 248 for storing software including the operating program for the compass system. The microcomputer also includes a random access memory (RAM) 252 for use in performing calculations, for flags and registers and other functions required for signal processing. The microcomputer is operative, under program control, to process the direction heading data signals from the sensor circuit 234 and to control the energization of the display 54 to indicate in abbreviated symbols, the heading of the vehicle.

The microcomputer 236, in the illustrative embodiment, is a Hitachi DP-42 microcomputer available from Hitachi Corporation of Japan. The microcomputer receives a regulated supply voltage on pin VCC from the output terminal of the power supply circuit 238. This power supply circuit includes an integrated circuit voltage regulator and has an input terminal connected to with the B+ or battery supply voltage of the vehicle, suitably through the ignition switch 254 of the vehicle. The common terminal of the power supply 238 is connected directly to chassis ground.

The reset circuit 242 is connected between the reset pin of the microcomputer and the pin VCC of the microcomputer. The reset circuit is operative to apply a momentary logic high signal to the reset pin each time the microcomputer is powered-up to reset the microcomputer circuits.

The EEPROM 244 is utilized for storage of certain data for use by the microcomputer. In particular, the value of the variation compensation is stored in the EEPROM. The voltage supply terminal VCC of the EEPROM is connected directly with the output terminal of the power supply and the ground terminal GRD is connected directly with the ground terminal of the voltage regulator. The data pins D0 and D1 of the EEPROM are connected directly with the correspondingly designated pins of the microcomputer. The clock pin CLK is connected directly with the pin D2 of the microcomputer and the pin CS of the EEPROM is connected directly with the pin D3 of the microcomputer.

The display 246 is a liquid crystal display of the multi-segment type for alphanumeric characters. Supply voltage for the display 246 is provided by the power supply 238. The six signal input terminals of the display 54 are connected respectively with output pins R01 through R3 and R10 through R13 of the microcomputer 314.

A clock circuit 256 is connected between the clock pins OSC1 and OSC2 of the microcomputer 236. Other pin connections for the microcomputer will be described in conjunction with the compass sensor circuit 212 which will be described presently.

The compass sensor circuit 234, as mentioned above, is located in the housing of the compass 50. In general, it comprises an optical transducer circuit 262 (of optical transducer 74 of FIGS. 5 and 6), and a coil circuit 264 which is used for both deviation compensation and rotor swinging.

The optical transducer circuit 262 comprises the pair of displacement sensors 102 and 104 and the reference position sensor 106. The displacement sensor 102 comprises the LED 192 and the phototransistor 124 which are optically coupled together as previously described. The displacement sensor 104 comprises the LED 196 and the photo transducer 134 which are optically coupled with each other. Similarly, the reference position sensor 106 comprises LED 194 and phototransistor 128 which are optically coupled, as previously described. The LEDs are energized continuously by the regulated voltage from power supply 238 through a resistor 274. The phototransistors have their collectors connected with the output of the power supply 238 and their emitters connected respectively with the input pins R42, R41 and R40 of the microcomputer. A manually actuated switch 276 is serially connected between the power supply output terminal and the input pin R43 of the microcomputer to initiate the execution of deviation compensation as will be described.

The coil circuit 264 comprises a set of four coils 34N, 34S, 32E and 32W which were described above as the compensating coils. (As shown in FIGS. 5 and 6, the east-west compensating coils 32E and 32W are shown as being mounted on the same support arm on one side of the rotor and the north-south compensating coils 34N and 34S are similarly mounted.) The coils 34N and 34S have one terminal connected through a resistor 278 to the output of the power supply 238. The other terminal of coil 34N is connected to ground through the collector and emitter of the switching transistor 282. The base of the transistor 282 is connected through a resistor to pin D7 of the microcomputer 236. The other terminal of coil 34S is connected to ground through the collector and emitter of a switching transistor 284 which has its base connected through a resistor to pin D6. In a similar manner, coils 32E and 32W have one terminal connected to the output of power supply 238 through a resistor 285. The other terminals of the coils are connected to ground, respectively, through switching transistors 286 and 288 which have their bases connected through respective resistors with pins D5 and D4. A protective diode is connected in parallel with each of the coils. This circuit permits selective energization of each of the coils individually under control of the microcomputer 252 to provide a predetermined compensating current for deviation compensation. A variable compensating current is provided for each coil by pulse width modulated (PWM) DC pulses controlled by the microcomputer 236 at the respective output pins D4, D5, D6 and D7. The pulse width is variable to provide a variable duty cycle ranging from a minimum duty cycle, the duty cycle being referred to herein as a PWM count to a maximum duty cycle or PWM count. Additionally, the four coils may be energized sequentially to provide for swinging of the compass rotor to initialize the compass as described as above.

OPERATION OF THE OPTICAL ENCODER

The operation of the optical encoder will now be described with reference to FIGS. 10, 13 and 14. For purposes of explanation, it will be assumed that the encoder disk 72 is in an angular position such that the reference line 222 thereof is in alignment with the direction reference axis 214. The reference line 222 is merely a direction pointer, not a physical or structural line, and it is defined by the location of the reference aperture 164 relative to the axis of rotation of the disk. With the encoder disk 72 in this position, the reference position sensor 106 produces a reference pulse which signifies that the encoder disk is in its "home" or reference position. With the encoder disk in the reference position, the apertures 162 thereof are positioned relative to the displacement sensors 102 and 104 as indicated in FIG. 10. The code track 158 comprises a cyclically repeating pattern around the circumference of the disk 72 of alternate apertures 162 and opaque sectors of equal angular width. Thus, an aperture 162 and an adjoining opaque sector may be considered to be one cycle in the pattern. The sensors 102 and 104 have an optical beam width which is effectively one-half the angular width of each of the apertures 162 and hence, one-half the width of the opaque sector between adjacent apertures. With this relationship, the sensors 102 and 104 are spaced from each other an angular distance corresponding to an integral number of cycles plus one-fourth cycle. This spacing of the sensors results in the generation of a pulse train by sensor 102 which is phase displaced from the pulse train generated by the sensor 104. More particularly, the pulse train from sensor 102 will lag behind the pulse train from sensor 104 when the encoder disk 72 is rotated in the clockwise direction and it will lead the pulse train from sensor 104 when the disk is rotated in the counterclockwise direction. The phase difference is one quarter cycle. This phase displacement is indicative of the direction of rotation of the encoder disk.

FIG. 13 is a graphical representation of the pulse signals generated by the sensors 106, 102 and 104. In this graphical representation, the abscissa axis represents angular displacement of the encoder disk 72 and the ordinate axis represents relative signal amplitude from the respective sensors. For explanatory purposes the pulses of the pulse trains, as shown in FIG. 13, are idealized as rectangular pulses. The pulse trains 302 and 304 are each alternately high for one-half cycle and low for one-half cycle. The logical pulses are each one quarter cycle wide. The reference pulse 306 is at a logical low value or "0" when the encoder disk is in the reference position shown. The pulse train 302 produced by the displacement sensor 102 is at a logical high or "1" and the pulse train produced by the sensor 104 is also at a logical high or "1" in the reference position of the encoder disk 72. When the encoder disk is rotated from the reference position in a clockwise direction, the displacement sensor 102 will produce logic signals, as represented by the pulse train 302, in the sequence of 1-1-0-0 as indicated by that notation on FIG. 13. When it is rotated in the counterclockwise direction, the logic signal will have the sequence of 1-0-0-1. At the same time, the sensor 104 will produce a logic signal having the sequence of 1-0-0-1 for clockwise rotation and the sequence of 1-1-0-0 for the counterclockwise direction. The displacement angle from zero degrees (or three hundred sixty degrees) is indicated on the lowermost abscissa axis of FIG. 13. The logic signals in the pulse trains 302 and 304 which are read simultaneously by the sensors 102 and 104 are combined as a pair, as shown in the table of FIG. 14, for each angular increment of displacement.

FIG. 14 shows the two bit logic signals produced by displacement sensors 102 and 104 as a function of angular position or displacement. For purposes of explanation, it will be assumed that the encoder disk 72 has been swung by the coil circuit 264 to the reference position, as shown in FIG. 10. In this position, the logic signal is 1—1. When the coil circuit 264 is no longer energized, the encoder disk will be free to rotate under the influence of the local magnetic field so that the north seeking pole thereof will become aligned with the magnetic north direction. With reference to FIG. 14, it is noted that the displacement count with the encoder disk in the reference position is taken as a value of one hundred twenty or a value of zero depending upon whether the rotation away from the reference position is in the clockwise or counterclockwise direction. It is further noted that with the encoder disk in the reference position, the angular position in degrees, as indicated in FIG. 14, is in the range of two hundred sixty-eight and one-half degrees to two hundred seventy-one and one-half degrees. This corresponds nominally with the direction of two hundred seventy degrees, it being further noted that this would be the magnetic heading indicated by the compass if the encoder disk remained in the reference position. This value of magnetic heading is obtained, as described above, by subtracting the offset angle Y of ninety degrees from the measured angular value of three hundred sixty degrees (corresponding to a count of one hundred twenty). As indicated in FIG. 14, the logic signal will remain at 1—1 over an angular range of three degrees spanning from two hundred sixty-eight and one-half degrees to two hundred seventy-one and one-half degrees. If the encoder disk is rotated clockwise past two hundred seventy-one and one-half degrees, the logic signal will change to 1—0 and remain at that value until it reaches an angular displacement of two hundred seventy-four and one-half degrees. When the displacement angle reaches that value, the logic signal will change to 0—0 and remain at that value until angular displacement is two hundred seventy-seven and one-half degrees. At that value the signal will change to 0—1 and remains at that value until the angular displacement is two hundred eighty and one-half degrees. Then, the sequence of logic signal values is repeated. For counterclockwise motion, the sequence of values of the two bit logic signals is 1—1, 0—1, 0—0 and 1—0 as shown in the table of FIG. 14 for corresponding angular increments of displacement. This sequence of logic signal values is repeated for continued rotation. With the encoder disk 34 in any angular position, its direction of rotation from that position can be determined by comparing the two bit logic signal at its current value with the previous logic signal value. For example, with the encoder disk in the reference position, the logic signal is 1—1. If the next logic signal is 1—0 the rotation is clockwise and if it is 0—1 the rotation is counterclockwise. In the illustrative embodiment, there are thirty apertures 162 in the code track. This, as can be seen from the table of FIG. 14, provides for an angular resolution of three degrees. Consequently, the number of discrete angular positions which can be determined for the encoder disk 34 is one hundred twenty. Therefore, the angular displacement from the reference position may be designated by a number ranging from zero to one hundred nineteen with a different number for each three degree increment. The reference position is designated either as a count of zero or the equivalent count of one hundred twenty. The angular position measured from the reference position may be designated as the cumulative count of the changes in the two bit logic signal values, taking into account the direction of rotation as being either clockwise or counterclockwise. FIG. 14 shows in the clockwise displacement count column the cumulative count for each angular position for clockwise direction and the counterclockwise displacement count column shows the cumulative count for each position for counterclockwise rotation. Therefore by starting the count at zero or one hundred twenty and incrementing it by one for each change of logic signal value in the clockwise direction and decrementing it by one for each change in the counterclockwise direction, the net or cumulative count will represent the unique angular displacement or position of the encoder disk 72 relative to the reference position.

DEVIATION COMPENSATION OF THE PARTICULAR EMBODIMENT

In the particular embodiment of the compass system described above, the optical encoder for measuring rotor displacement provides for angular resolution of three degrees. This arises from the use of thirty apertures 162 in the code track which are detected by the pair of displacement sensors 102 and 104 which generate respective pulse trains which are phase displaced by one quarter cycle as described with reference to FIG. 13. The dual bit code produced by the displacement sensors 102 and 104 of the encoder changes at three degree increments of rotor rotation. Thus, when the rotor is rotated from the reference position (shown in FIG. 10) in a clockwise direction the dual bit code will initially be 1—1 and it will change to 1—0, 0—0, and 0—1 for each three degree increment rotation. The angular resolution of three degrees is a satisfactory degree of accuracy for vehicle heading indication; however, it is desired to obtain a more accurate determination of rotor position for purposes of deviation compensation. Accordingly, a method is provided for determining the position of the rotor within a given measurement increment, i.e. a three degree increment, as will be described below.

The deviation compensation method, as applied to the particular embodiment of the compass system, will be described with reference to the vector diagrams of FIGS. 15A, 15B and 16 and with reference to the flow charts of FIGS. 17A, 17B and 17C. The method to be described is the same, in principle, as that described above with reference to FIGS. 2A, 2B, 3A, 3B and 4; however, it is adapted to produce a higher degree of resolution of angular measurement for effecting the deviation compensation.

The compass is initialized and the vehicle is positioned with the direction reference axis 14 oriented at any arbitrary angle A relative to magnetic north. As shown in FIG. 15A, the earth magnetic field vector E is vectorially added to the deviating field vector V produced by the vehicle to produce the resultant magnetic field vector D1. In this condition, the driver actuates the push button switch 276 to cause the microcomputer 236 to execute the program for compensating the compass for deviation. The operating program for the deviation compensation process is stored in the ROM 248 of the microcomputer and is represented by the flow chart of FIGS. 17A, 17B and 17C.

Figure 17A:
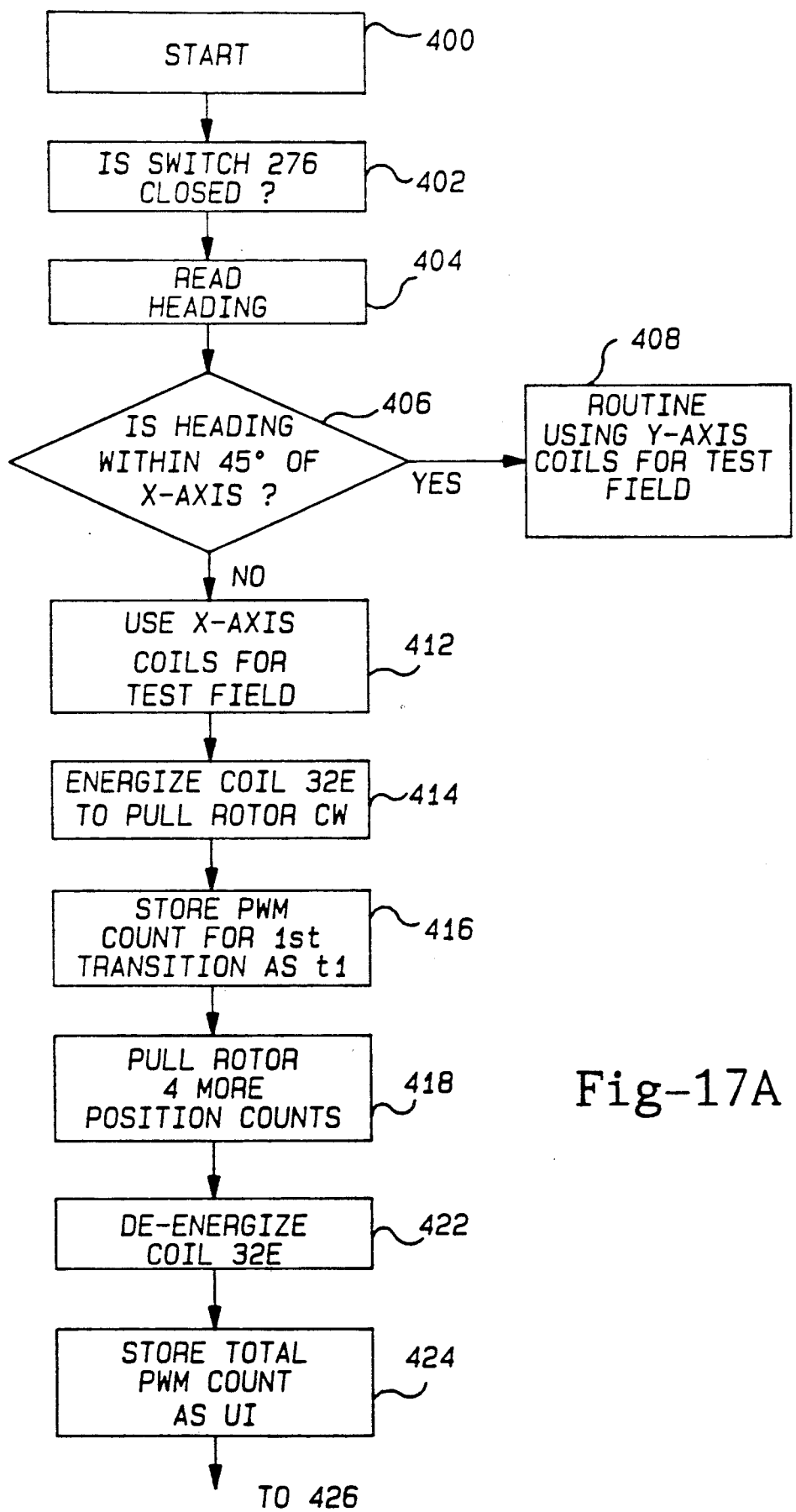
Figure 17C:
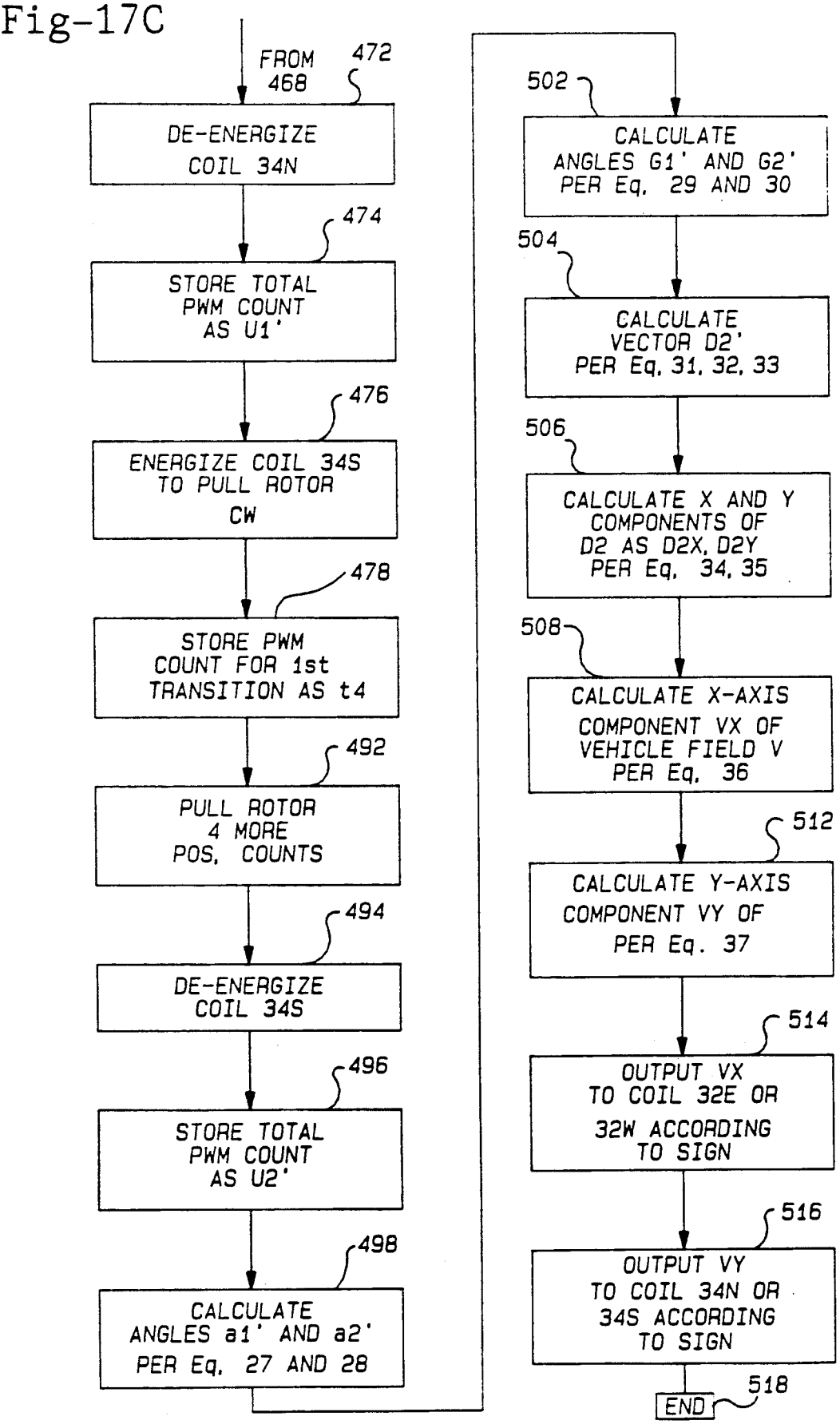

As shown in the flow chart of FIG. 17A, the program begins at the block 400 and test block 402 determines whether the switch 276 is closed. If it is, the program advances to block 404 which reads the vehicle heading indicated by the uncompensated compass which responds to the resultant field vector D1. Then, the program advances to block 406 which determines whether the heading indication is within forty-five degrees of the X-axis of the compass. If it is, the program advances to block 408 which initiates a routine using the Y-axis as a reference for angle measurement. In the description that follows, it is assumed that the indicated heading is not within forty-five degrees of the X-axis and therefore the program proceeds to block 412 which proceeds with a routine using the Y-axis as a reference for angle measurement. (The routine called up by block 408 is analogous to that called up by 412 and the former will not be described.) The program then advances to block 414 which energizes the east compensation coil 32E to pull the rotor in a clockwise direction. Block 416 stores as t1 the current pulse width modulation (PWM) count value required to move the rotor to the next transition count position, i.e. one of the one hundred twenty positions described with reference to FIG. 14. Thus, if the rotor was at rest at an unknown angular position within a measurement increment of three degrees, the value of current required to pull the rotor to the transition point between that increment and the next increment is memorized. Block 418 energizes the coil until the rotor is pulled an additional four position counts, i.e. through the next four full measurement increments of three degrees each. Block 422 deenergizes the compensating coil 32E and the block 424 stores the PWM count which was required to pull the rotor from rest position to the test position. This count represents an angle of four full measurement increments of three degrees each plus an unknown fraction of a measurement increment. The value of the pulse width modulation count is represented by the vector U1 in FIG. 15A.

Next, the program advances to block 426 in FIG. 17B and energizes the west compensation coil 32W to pull the rotor in a counterclockwise direction. Block 428 stores as t2 a current pulse width modulation count value required to pull the rotor to the next transition count position. Then, block 432 energizes the compensation coil 32W to pull the rotor through an additional four position counts. Block 434 deenergizes the coil 32W and block 436 stores the total pulse width modulation count which is represented by the vector U2 shown in FIG. 15A. The program then advances to block 442 which calculates the angles a1 and a2. This calculation is made in accordance with the following equations:

$$a1 = 4 \times 3° + (3° \times t1)/t1+t2 \tag{18}$$

$$a2 = 4 \times 3° + (3° \times t2)/t1+t2 \tag{19}$$

Figure 15A:
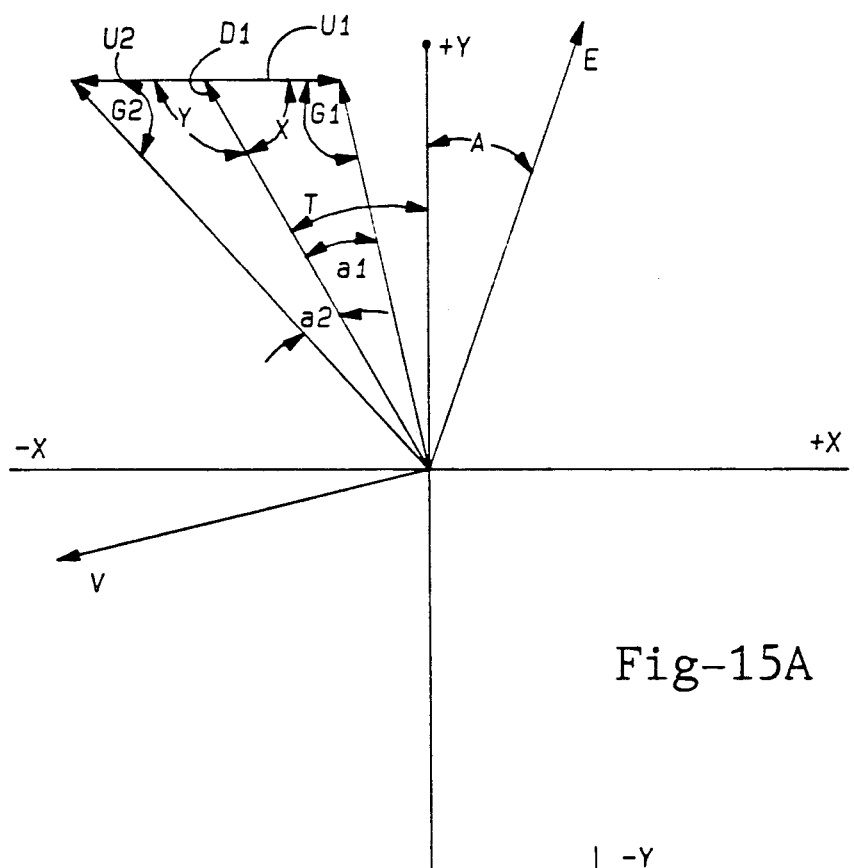
FIGS. 15A, 15B and 16 are vector diagrams for explanation of the compensation method applied to the particular compass embodiment.
Figure 15B:
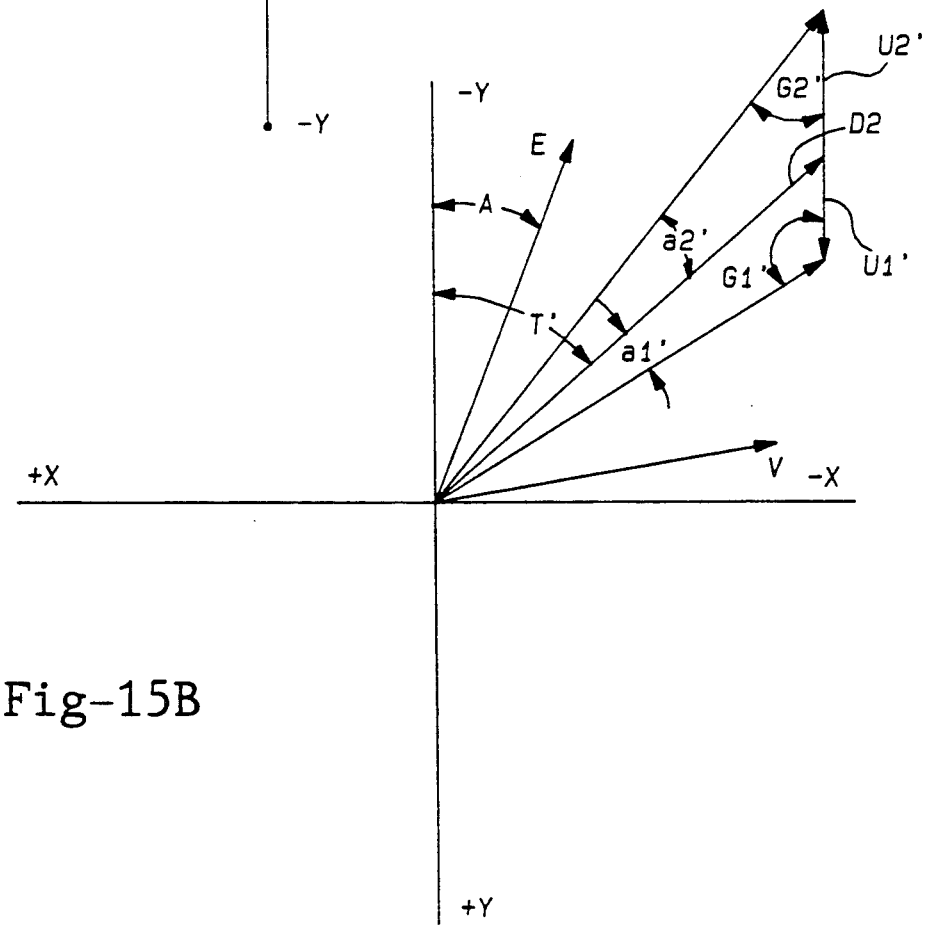
Figure 16:
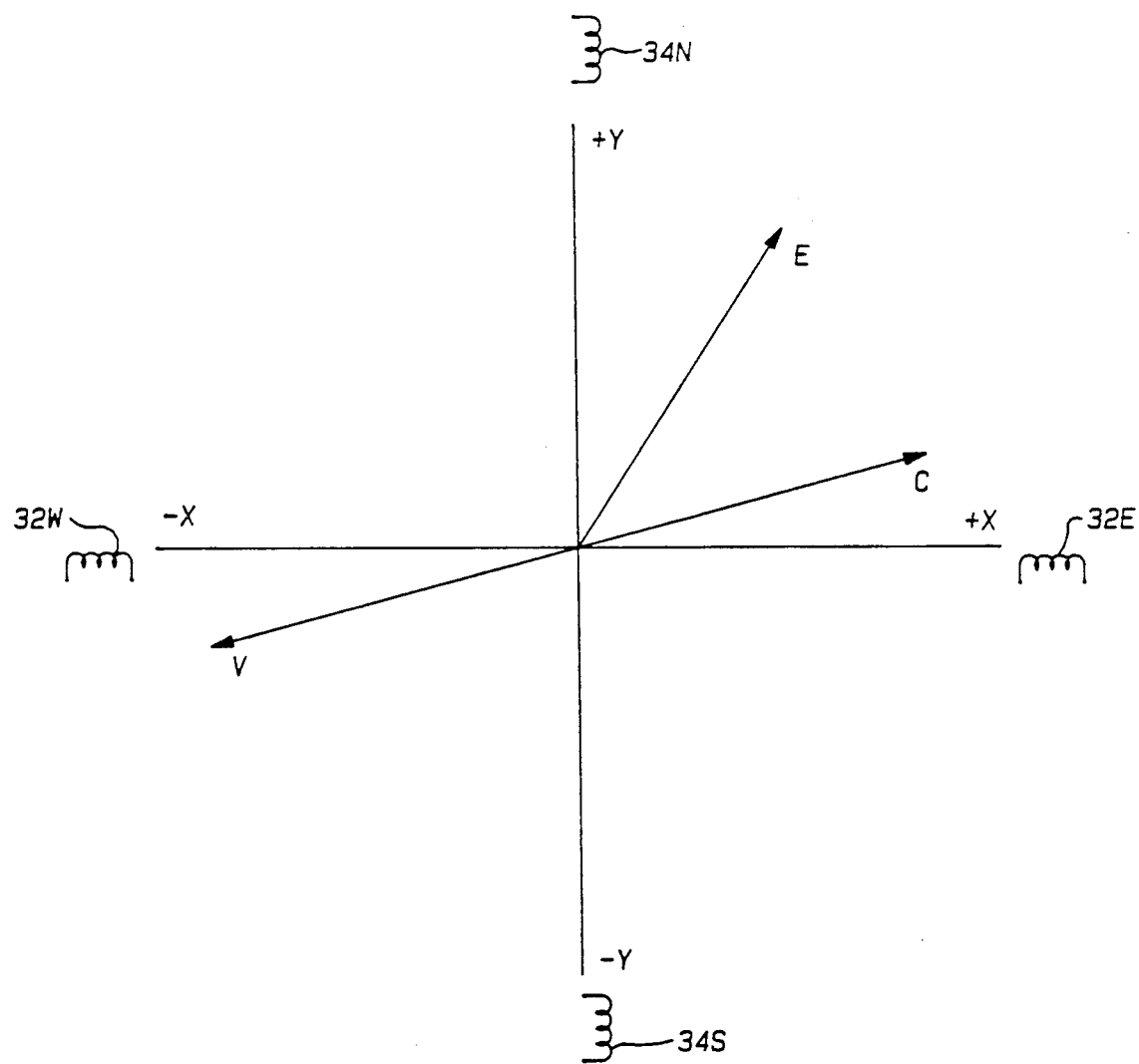

Then the program advances to block 444 which calculates the angles G1 and G2 shown in FIG. 15A. This calculation is made in accordance with the following equations:

$$G1 = 90° + T - a1 \tag{20}$$

$$G2 = 90° - T - a2 \tag{21}$$

Then, the program advances to block 446 which calculates the value of the resultant vector D1. The value of D1 is first calculated as D1, using the vector U1, in accordance with the following equation:

$$D1' = (U1)(\sin G1)/\sin a1 \tag{22}$$

Then D1 is calculated as D1" using the value of vector U2, in accordance with the equation:

$$D1'' = (U2)(\sin G2)/\sin a2 \tag{23}$$

Then, the value of D1 is taken as the average of the values of D1, and D1" in accordance with following equation:

$$D1 = (D1' + D1'')/2 \tag{24}$$

The program then advances to block 448 which calculates the X-axis and Y-axis components of the resultant vector D1. This calculation is made in accordance with the following:

$$D1X = D1 \cos(90° - T) \tag{25}$$

$$D1Y = D1 \sin(90° - T) \tag{26}$$

Then, the program advances to block 452 which puts a prompt message on the display telling the driver to turn the car around and point it in the opposite direction.

After the car is reoriented in the opposite direction, the driver again closes switch 276 to resume the execution of the compensation process by the microcomputer 236. The program continues at block 454 and reads the indicated heading. The indicated heading will be determined by the resultant field vector D2 as shown in FIG. 15B. Since this vector is within forty-five degrees of the X-axis, the program will proceed from the test block 456 to the block 462 which calls for use of the Y-axis coils for producing the test field to pull the rotor in the compensation process. The steps of the program from block 462 (FIG. 17B) through block 506 (FIG. 17C) are substantially the same as that described above with reference to block 414 through block 448 and only a brief description will be given. Block 464 energizes coil 34N and block 466 stores the count for the first transition as t3. Block 474 stores the total PWM count as U1'. Block 476 energizes coil 34S and the PWM count for the first transition is stored as t4. Block 496 stores the total PWM count as U2'. Block 498 calculates the angles A1, and A2, (see FIG. 15B) using the following equation:

$$a1' = 4 \times 3^* + (3^* \times t3)/(t3+t4) \tag{27}$$

$$a2' = 4 \times 3^* + (3^* \times t4)/(t3+t4) \tag{28}$$

The angles G1, and G2, are calculated at block 502 by the following equations:

$$G1' = 90^* + TC - a1' \tag{29}$$

where TC = complement of angle T, and $$G2' = 90^* + (TC + a2') \tag{30}$$

The resultant field vector D2 is calculated at block 504. The value of D2 is first calculated as D2' using the vector U1, as follows:

$$D2' = (U1') (\sin G1')/\sin(a1') \tag{31}$$

Then D2 is calculated as D2" using vector U2, as follows:

$$D2'' = (U2') (\sin G2')/\sin (a2') \tag{32}$$

Finally, D2 is taken as the average of D2' and D2":

$$D2 = (D2' + D2'')/2 \tag{33}$$

The X and Y-axis components of the resultant field vector $V_{D2}$ are calculated at block 506 in accordance with the following equations:

$$D2X = D2 \cos (90^* - T) \tag{34}$$

$$D2Y = D2 \sin (90^* - T) \tag{35}$$

Next, the block 508 calculates the X-axis component VX of the vehicle field V in accordance with the following equation:

$$VX = (D1X + d2X)/2 \tag{36}$$

Next, block 512 calculates the Y-axis component of the vehicle field in accordance with the following equation:

$$VY = (D1Y + D2Y)/2 \tag{37}$$

The compass is compensated by the blocks 514 and 516 which supply the calculated values of compensating current to the compensation coils of the compass. Block 514 supplies a current corresponding to VX to the coil 32E or 32W in accordance with the algebraic sign of the calculated value. Similarly, block 516 supplies a current corresponding to VY to the coil 34N or 34S according to algebraic sign. The program then advances to the end block 514 and is completed.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. The method of compensating a magnetic compass in a vehicle for magnetic deviation of the earth's magnetic field comprising the steps of:

(1) orienting the vehicle in any selected direction relative to magnetic north,
    (2) measuring the angle between a direction reference axis of the vehicle and the direction indicated by said magnetic compass in said vehicle,
    (3) adding a magnetic field at a known angle relative to said direction reference axis of the vehicle and memorizing the strength of the added magnetic field required to displace the direction indicated by said compass through a first predetermined angle,
    (4) and calculating the strength of the resultant magnetic field using the measured angle, the first predetermined angle and the memorized strength of the added magnetic field,
    (5) orienting the vehicle with said direction reference axis pointing one hundred eighty degrees away from said selected direction,
    (6) measuring the angle between the direction reference axis of the vehicle and the direction indicated by said magnetic compass,
    (7) adding a magnetic field at a known angle relative to said direction reference axis of the vehicle and memorizing the strength of the added magnetic field required to displace the direction indicated by said compass through a second predetermined angle,
    (8) calculating the strength of the resultant magnetic field using the last measured angle, the second predetermined angle and the last memorized strength of the added magnetic field,
    (9) and using the values of said resultant magnetic fields to determine the compensation required for said magnetic deviation.

2. The invention as defined in claim 1 wherein said compass has a magnetic rotor movable in a frame having X and Y axes and having X-axis and Y-axis compensation coils, said frame having a known orientation relative to said direction reference axis, said method including the steps of:

(1) calculating the respective X-axis and Y-axis components of said first and second resultant magnetic fields,
    (2) and calculating the strength of the X-axis and Y-axis components of the deviation magnetic field as one-half the sum of said X-axis and Y-axis components, respectively, of said first and second resultant magnetic fields.

3. The invention as defined in claim 2 including the steps of:

applying a compensating current to said X-axis compensation coil to produce a magnetic field vector equal and opposite to said X-axis component of the deviating magnetic field, and applying a compensating current to said Y-axis compensation coil to produce a magnetic field equal and opposite to said Y-axis component of the deviating magnetic field.

4. The invention as defined in claim 2 wherein:
the strength of each of said resultant magnetic fields is calculated using the law of sines.

5. The method of determining the strength of a resultant magnetic field in a vehicle which results from a deviating magnetic field and the earth's magnetic field, said method comprising the steps of:

(1) measuring the angle between a direction reference axis of the vehicle and the direction indicated by said magnetic compass in said vehicle, (2) adding a magnetic field at a known angle relative to said direction reference axis of the vehicle and memorizing the strength of the added magnetic field required to displace the direction indicated by said compass through a predetermined angle, (3) and calculating the strength of the resultant magnetic field using the measured angle, the predetermined angle and the memorized strength of the added magnetic field.

6. The method of compensating a magnetic compass in a vehicle for magnetic deviation, said compass having a pair of compensating coils, said method comprising the steps of:

(1) orienting said vehicle in any selected direction relative to the magnetic north direction whereby the rotor orients itself with said polar axis in alignment with a first resultant magnetic field resulting from a deviating magnetic field in the vehicle and the earth's magnetic field, and thereafter,:

(2) measuring the first uncompensated heading angle between said polar axis and a direction reference axis of the vehicle, (3) applying a first current to one of the compensation coils to generate a first test magnetic field to displace the rotor through a first predetermined angle to a first displaced orientation in which said polar axis is at a first test angle with said first test magnetic field, (4) memorizing the value of said first current, (5) calculating said first test angle using said first uncompensated heading angle and said predetermined angle, (6) calculating the strength of said first resultant magnetic filed using said first predetermined angle, said first test angle and the strength of said first test magnetic field, (7) orienting the vehicle with said direction reference axis pointing one hundred eighty degrees away from said selected direction whereby the rotor orients itself with said polar axis in alignment with a second resultant magnetic field resulting from said deviating magnetic field in the vehicle and the earth's magnetic field, and thereafter, (8) measuring the second uncompensated heading angle between said polar axis and the direction reference axis, (9) applying a second current to one of the compensation coils to generate a second test magnetic field to displace the rotor through a second predetermined angle to a second displaced orientation in which said polar axis is at a second test angle with said second test magnetic field,

(10) memorizing the value of said second current,

(11) calculating said second test angle using said second uncompensated heading angle and said second predetermined angle,

(12) calculating the strength of said second resultant magnetic field using said second predetermined angle, said second test angle and the strength of said second test magnetic field,

(13) calculating the respective X-axis and Y-axis components of said first and second resultant magnetic fields,

(14) and calculating the strength of the X-axis and Y-axis components of the X-axis and Y-axis components, respectively, of said deviation magnetic field as one-half the sum of said first and second resultant magnetic fields.

7. The invention as defined in claim 6 wherein one of said compensating coils is an X-axis compensation coil and the other is Y-axis compensation coil and including the steps of:

applying a compensating current to said X-axis compensation coil to produce a magnetic field equal and opposite to said X-axis component of the deviating magnetic field, and applying a compensating current to said Y-axis compensation coil to produce a magnetic field equal and opposite to said Y-axis component of the deviating magnetic field.

8. The invention as defined in claim 6 wherein said Y-axis is in alignment with said direction reference axis and including the steps of:

if said first uncompensated heading angle is less than forty-five degrees, calculating said first test angle using said first uncompensated heading angle and said first predetermined angle, if said first uncompensated heading angle is greater than forty-five degrees, calculating said first test angle using said first predetermined angle and the complement of said first uncompensated heading angle, if said second uncompensated heading angle is less than forty-five degrees, calculating said second test angle using said second predetermined angle and said second uncompensated heading angle, and if said second uncompensated heading angle is greater than forty-five degrees, calculating said second test angle using said second predetermined angle and the complement of said second uncompensated heading angle.

9. The invention as defined in claim 6 including the steps of:

while said vehicle is oriented in said selected direction, applying a third current to one of said compensation coils to generate a third test magnetic field opposite said first test magnetic field to displace the rotor through a third predetermined angle to a third displaced orientation in which said polar axis is at a third test angle with said third test magnetic field, memorizing the value of said third current, calculating said third test angle using said first uncompensated heading angle and said third predetermined angle, calculating the strength of said first resultant magnetic field using said first predetermined angle, said third test angle and the strength of said third test magnetic field, while said vehicle is oriented with said direction reference axis pointing one hundred eighty degrees away from said selected direction:

applying a fourth current to one of the compensation coils to generate a fourth test magnetic field opposite said second test magnetic field to displace the rotor through a fourth measured angle to a fourth displaced orientation in which said polar axis is at a fourth test angle with said fourth test magnetic field, memorizing the value of said fourth current, calculating said fourth test angle using said second uncompensated heading angle and said fourth predetermined angle, calculating the strength of said second resultant magnetic field using said second predetermined angle, said fourth test angle and the strength of said fourth test magnetic field, calculating the average of the two calculated strengths of the first resultant magnetic field, calculating the average values of the two calculated strengths of the second resultant magnetic field, and using said average values for calculating the respective X-axis and Y-axis components of the first and second resultant fields.

10. The invention as defined in claim 9 wherein:

said first uncompensated heading angle is a predetermined number of measurement increments plus a first unknown fraction of a measurement increment, said second uncompensated heading angle is a predetermined number of measurement increments plus a second unknown fraction a measurement increment, memorizing the value of that portion of said first current which is sufficient to displace said polar axis from its alignment with said first resultant magnetic field to the beginning of the next measurement increment, memorizing the value of that portion of said second current which is sufficient to displace said polar axis from its alignment with said second resultant magnetic field to the beginning of the next measurement increment, memorizing the value of that portion of the third current which is sufficient to displace said polar axis from alignment with said first resultant magnetic field to the beginning of the next measurement increment, memorizing the value of that portion of said fourth current which is sufficient to displace the rotor from its alignment with said second resultant magnetic field to the next measurement increment, using the ratio of the first-mentioned and third-mentioned current portions, calculating respective correction angle for said first and third predetermined angles and adding said correction angles, respectively, to said first and third predetermined angles, using the ratio of said second-mentioned and fourth-mentioned portions of current, calculating respective correction angles for said second and fourth predetermined angles, and adding said correction angles, respectively, to said second and fourth predetermined angles.

11. The invention as defined in claim 6 wherein:

the strength of said first resultant magnetic field is calculated using the law of sines, and the strength of the second resultant magnetic field is calculated using the law of sines.

12. Apparatus for compensating a magnetic compass in a vehicle for magnetic deviation, said compass having a magnetic rotor and having a known orientation relative to the direction reference axis of the vehicle and having compensation coils, said apparatus comprising:

(1) means for measuring the angle between said direction reference axis and the direction indicated by said magnetic compass, (2) means for adding a magnetic field at a known angle relative to said direction reference axis, (3) means for memorizing the strength of the added magnetic field required to displace the direction indicated by said compass through a first predetermined angle, (4) and means for calculating the strength of the resultant magnetic field using the measured angle, the predetermined angle and the memorized strength of the added magnetic field.

13. The invention as defined in claim 12 wherein said magnetic rotor is movable in a frame having X and Y axes and wherein said compass has an X-axis compensation coil and Y-axis compensation coil, said apparatus including:

(1) means for calculating the X and Y-axis components of said resultant magnetic field with said vehicle oriented in a selected direction relative to magnetic north, (2) means for calculating the X-axis and Y-axis components of said resultant magnetic field with said vehicle oriented in a direction one hundred eighty degrees away from the selected direction, (3) and means for calculating the strength of the X-axis and Y-axis components of the deviation magnetic field as one-half the sum of said X-axis and Y-axis components, respectively, of the aforementioned resultant magnetic fields.

14. The invention as defined in claim 13 including:

(1) means for applying a compensating current to said X-axis compensation coil to produce a magnetic field equal and opposite to the X-axis component of the deviating magnetic field, (2) and means for applying the compensating current to the Y-axis compensation coil to produce the magnetic field equal and opposite to said Y-axis component of the deviating magnetic field.

* * * * *

UNITED STATES PATENT AND TRADEMARK OFFICE
CERTIFICATE OF CORRECTION

PATENT NO. : 5,131,154
DATED : July 21, 1992
INVENTOR(S) : Kenneth L. Schierbeek, et al.

It is certified that error appears in the above-indentified patent and that said Letters Patent is hereby corrected as shown below:

Column 3, line 28,
delete "lo" and substitute -- 10 --.
      Column 5, line 1,
delete "Of" and substitute -- of --.
      Column 5, line 37,
delete "E" and substitute -- -E --.
      Column 6, line 46,
delete "U" and insert -- U' --.
      Column 6, lines 51 and 55,
lines 1 and 5, in each instance delete "T" and insert -- T' --.

Column 13, line 13,
delete "with".
      Column 18, line 45
delete "as D1" and insert -- D1' --.
      Column 18, line 56,
delete "of D1" and insert -- of D1' --.
      Column 18, line 67,
delete "90° =T" and insert -- 90° -T --.

UNITED STATES PATENT AND TRADEMARK OFFICE
CERTIFICATE OF CORRECTION

PATENT NO. : 5,131,154
DATED : July 21, 1992
INVENTOR(S) : Kenneth L. Schierbeek, et al.

It is certified that error appears in the above-indentified patent and that said Letters Patent is hereby corrected as shown below:

Column 19, lines 57 and 59, in each instance delete "T" and insert -- T' --.

Column 19, line 65, delete "d" and insert -- D --.

Signed and Sealed this

Twenty-second Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,131,154

DATED : July 21, 1992

INVENTOR(S) : Schierbeek et al.

It is certified that error appears in the above-identified patent and that said Letters Patent is hereby corrected as shown below:

Column 3, line 28, delete "1o" and substitute -- 10 --.

Column 5, line 1, delete "Of" and substitute -- of --.

Column 5, line 37, delete "E" and substitute -- -E --.

Column 6, line 46, delete "U" and insert -- U' --.

Column 6, lines 51 and 55, in each instance delete "T" and insert -- T' --.

Column 13, line 13, delete "with".

Column 18, line 45 delete "as D1" and insert -- D1' --.

Column 18, line 56, delete "of D1" and insert -- of D1' --.

Column 18, line 67, delete "90° = T" and insert -- 90° - T --.

Column 19, line 41, delete "U1" and insert -- U1' --.

Column 19, line 45, delete "U2" and insert -- U2' --.

Column 19, lines 57 and 59, in each instance delete "T" and insert -- T' --.

UNITED STATES PATENT AND TRADEMARK OFFICE
CERTIFICATE OF CORRECTION

PATENT NO. : 5,131,154
DATED : July 21, 1992
INVENTOR(S) : Schierbeek, et. al.

It is certified that error appears in the above-indentified patent and that said Letters Patent is hereby corrected as shown below:

Column 19, line 65, delete "d" and insert -- D --.

This certificate supersedes Certificate of Correction issued November 22, 1994

Signed and Sealed this

First Day of August, 1995

Attest:

BRUCE LEHMAN

Attesting Officer    Commissioner of Patents and Trademarks